(12) United States Patent
Peart et al.

(10) Patent No.: US 7,587,756 B2
(45) Date of Patent: Sep. 8, 2009

(54) METHODS AND APPARATUS FOR A SECURE PROXIMITY INTEGRATED CIRCUIT CARD TRANSACTIONS

(75) Inventors: Lee J. Peart, Epsom (GB); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 632 days.

(21) Appl. No.: 10/710,611

(22) Filed: Jul. 23, 2004

(65) Prior Publication Data

US 2005/0033688 A1 Feb. 10, 2005

(51) Int. Cl.
*G06F 7/04* (2006.01)
*H04L 9/00* (2006.01)
*G06F 11/00* (2006.01)

(52) U.S. Cl. .............................. 726/9; 726/26; 726/27; 726/28; 726/29; 726/30; 713/172; 713/173; 380/232; 380/234; 380/235; 380/236

(58) Field of Classification Search ...................... 726/9
See application file for complete search history.

(56) References Cited

U.S. PATENT DOCUMENTS

| | | | |
|---|---|---|---|
| 4,303,904 A | 12/1981 | Chasek | |
| 4,443,027 A | 4/1984 | McNeely et al. | |
| 4,450,535 A | 5/1984 | de Pommery et al. | |
| 4,475,308 A | 10/1984 | Heise et al. | |
| 4,583,766 A | 4/1986 | Wessel | |
| 4,639,765 A | 1/1987 | dHont | |
| 4,672,021 A | 6/1987 | Blumel et al. | |
| 4,700,055 A | 10/1987 | Kashkashian, Jr. | |
| 4,736,094 A | 4/1988 | Yoshida | |
| 4,739,328 A | 4/1988 | Koelle et al. | |
| 4,837,422 A | 6/1989 | Dethloff et al. | |
| 4,839,504 A | 6/1989 | Nakano | |
| 4,868,849 A | 9/1989 | Tamaoki | |
| 4,961,142 A | 10/1990 | Elliott et al. | |

(Continued)

FOREIGN PATENT DOCUMENTS

CH 689070 8/1998

(Continued)

OTHER PUBLICATIONS

International Search Report and Written Opinion of the International Searching Authority, PCT/US05/26067, May 23, 2007.

(Continued)

*Primary Examiner*—Longbit Chai
(74) *Attorney, Agent, or Firm*—Fitzpatrick, Cella, Harper & Scinto

(57) ABSTRACT

Methods and apparatus for a smartcard system are provided which securely and conveniently provides for secure transaction completion in a contact or contactless environment. The invention utilizes selection of processing applications based on the account issuer parameters and risk factors (stored on a smartcard) and merchant system parameters and risk factors (stored on a merchant system database). The invention permits a merchant system and smartcard to exchange information useful for determining if particular transactions should be completed online or offline.

13 Claims, 11 Drawing Sheets

U.S. PATENT DOCUMENTS

| | | |
|---|---|---|
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,274,392 A | 12/1993 | dHont, et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,350,906 A | 9/1994 | Brody |
| 5,351,052 A | 9/1994 | dHont et al. |
| 5,365,551 A | 11/1994 | Snodgrass et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,453,601 A | 9/1995 | Rosen |
| 5,453,747 A | 9/1995 | dHont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A | 3/1996 | Langhans et al. |
| 5,500,651 A | 3/1996 | Schuermann |
| 5,504,808 A | 4/1996 | Hamrick |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | dHont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,385 A | 6/1998 | Simon |
| 5,768,609 A | 6/1998 | Gove et al. |
| 5,770,843 A | 6/1998 | Rose |
| 5,774,882 A | 6/1998 | Keen et al. |
| 5,777,903 A | 7/1998 | Piosenka |
| 5,778,067 A | 7/1998 | Jones et al. |
| 5,778,069 A | 7/1998 | Thomlinson et al. |
| 5,785,680 A | 7/1998 | Niezink et al. |

| | | | | | |
|---|---|---|---|---|---|
| 5,792,337 A | 8/1998 | Padovani et al. | 5,949,876 A | 9/1999 | Ginter et al. |
| 5,793,324 A | 8/1998 | Aslanidis et al. | 5,953,512 A | 9/1999 | Cai et al. |
| 5,794,095 A | 8/1998 | Thompson | 5,953,710 A | 9/1999 | Fleming |
| 5,797,060 A | 8/1998 | Thompson | 5,955,717 A | 9/1999 | Vanstone |
| 5,797,085 A | 8/1998 | Beuk et al. | 5,955,969 A | 9/1999 | dHont |
| 5,797,133 A | 8/1998 | Jones et al. | 5,956,024 A | 9/1999 | Strickland et al. |
| 5,798,709 A | 8/1998 | Flaxl | 5,956,699 A | 9/1999 | Wong et al. |
| 5,809,142 A | 9/1998 | Hurta et al. | 5,958,004 A | 9/1999 | Helland et al. |
| 5,809,288 A | 9/1998 | Balmer | 5,960,411 A | 9/1999 | Hartman et al. |
| 5,809,633 A | 9/1998 | Mundigl et al. | 5,963,915 A | 10/1999 | Kirsch |
| 5,825,007 A | 10/1998 | Jesadanont | 5,963,924 A | 10/1999 | Williams et al. |
| 5,825,302 A | 10/1998 | Stafford | 5,966,697 A | 10/1999 | Fergerson et al. |
| 5,826,077 A | 10/1998 | Blakeley et al. | 5,970,148 A | 10/1999 | Meier |
| 5,826,241 A | 10/1998 | Stein | 5,970,471 A | 10/1999 | Hill |
| 5,826,242 A | 10/1998 | Montulli | 5,970,472 A | 10/1999 | Allsop et al. |
| 5,826,243 A | 10/1998 | Musmanno et al. | 5,970,473 A | 10/1999 | Gerszberg et al. |
| 5,828,044 A | 10/1998 | Jun et al. | 5,970,475 A | 10/1999 | Barnes et al. |
| 5,834,756 A | 11/1998 | Gutman et al. | RE36,365 E | 11/1999 | Levine et al. |
| 5,835,894 A | 11/1998 | Adcock et al. | 5,978,840 A | 11/1999 | Nguyen et al. |
| 5,841,364 A | 11/1998 | Hagl et al. | 5,979,757 A | 11/1999 | Tracy et al. |
| 5,842,088 A | 11/1998 | Thompson | 5,982,293 A | 11/1999 | Everett et al. |
| 5,844,218 A | 12/1998 | Kawan et al. | 5,983,207 A | 11/1999 | Turk et al. |
| 5,844,230 A | 12/1998 | Lalonde | 5,983,208 A | 11/1999 | Haller |
| 5,845,267 A | 12/1998 | Ronen | 5,984,180 A | 11/1999 | Albrecht |
| 5,851,149 A | 12/1998 | Xidos et al. | 5,987,140 A | 11/1999 | Rowney et al. |
| 5,852,812 A | 12/1998 | Reeder | 5,987,155 A | 11/1999 | Dunn et al. |
| 5,854,891 A | 12/1998 | Postlewaite et al. | 5,987,498 A | 11/1999 | Athing et al. |
| 5,858,006 A | 1/1999 | Van der AA et al. | 5,989,950 A | 11/1999 | Wu |
| 5,859,419 A | 1/1999 | Wynn | 5,991,413 A | 11/1999 | Arditti et al. |
| 5,859,779 A | 1/1999 | Giordano et al. | 5,991,608 A | 11/1999 | Leyten |
| 5,862,325 A | 1/1999 | Reed et al. | 5,991,748 A | 11/1999 | Taskett |
| 5,864,306 A | 1/1999 | Dwyer et al. | 5,991,750 A | 11/1999 | Watson |
| 5,864,323 A | 1/1999 | Berthon | 5,996,076 A | 11/1999 | Rowney et al. |
| 5,864,830 A | 1/1999 | Armetta et al. | 5,999,914 A | 12/1999 | Blinn et al. |
| 5,867,100 A | 2/1999 | dHont | 6,000,832 A | 12/1999 | Franklin et al. |
| 5,870,031 A | 2/1999 | Kaiser et al. | 6,002,438 A | 12/1999 | Hocevar et al. |
| 5,870,915 A | 2/1999 | dHont | 6,002,767 A | 12/1999 | Kramer |
| 5,878,138 A | 3/1999 | Yacobi | 6,003,014 A | 12/1999 | Lee et al. |
| 5,878,141 A | 3/1999 | Daly et al. | 6,005,942 A | 12/1999 | Chan et al. |
| 5,878,215 A | 3/1999 | Kling et al. | 6,006,216 A | 12/1999 | Griffin et al. |
| 5,878,337 A | 3/1999 | Joao et al. | 6,009,412 A | 12/1999 | Storey |
| 5,878,403 A | 3/1999 | DeFrancesco et al. | 6,011,487 A | 1/2000 | Plocher |
| 5,880,675 A | 3/1999 | Trautner | 6,012,039 A | 1/2000 | Hoffman et al. |
| 5,881,272 A | 3/1999 | Balmer | 6,012,049 A | 1/2000 | Kawan |
| 5,883,810 A | 3/1999 | Franklin et al. | 6,012,143 A | 1/2000 | Tanaka |
| 5,884,280 A | 3/1999 | Yoshioka et al. | 6,012,636 A | 1/2000 | Smith |
| 5,887,266 A | 3/1999 | Heinonen et al. | 6,014,634 A | 1/2000 | Scroggie et al. |
| 5,890,137 A | 3/1999 | Koreeda | 6,014,635 A | 1/2000 | Harris et al. |
| 5,897,622 A | 4/1999 | Blinn et al. | 6,014,636 A | 1/2000 | Reeder |
| 5,898,783 A | 4/1999 | Rohrbach | 6,014,645 A | 1/2000 | Cunningham |
| 5,898,838 A | 4/1999 | Wagner | 6,014,646 A | 1/2000 | Vallee et al. |
| 5,903,830 A | 5/1999 | Joao et al. | 6,014,648 A | 1/2000 | Brennan |
| 5,903,875 A | 5/1999 | Kohara | 6,014,650 A | 1/2000 | Zampese |
| 5,903,880 A | 5/1999 | Biffar | 6,014,748 A | 1/2000 | Tushi et al. |
| 5,905,798 A | 5/1999 | Nerlikar et al. | 6,016,482 A | 1/2000 | Molinari et al. |
| 5,905,908 A | 5/1999 | Wagner | 6,016,484 A | 1/2000 | Williams et al. |
| 5,909,492 A | 6/1999 | Payne et al. | 6,018,717 A | 1/2000 | Lee et al. |
| 5,912,678 A | 6/1999 | Saxena et al. | 6,018,718 A | 1/2000 | Walker et al. |
| 5,913,203 A | 6/1999 | Wong et al. | 6,021,943 A | 2/2000 | Chastain |
| 5,914,472 A | 6/1999 | Foladare et al. | 6,023,510 A | 2/2000 | Epstein |
| 5,915,023 A | 6/1999 | Bernstein | 6,024,286 A | 2/2000 | Bradley et al. |
| 5,917,168 A | 6/1999 | Nakamura et al. | 6,029,147 A | 2/2000 | Horadan et al. |
| 5,918,216 A | 6/1999 | Miksovsky et al. | 6,029,149 A | 2/2000 | Dykstra et al. |
| 5,920,628 A | 7/1999 | Indeck et al. | 6,029,150 A | 2/2000 | Kravitz |
| 5,923,734 A | 7/1999 | Taskett | 6,029,890 A | 2/2000 | Austin |
| 5,929,801 A | 7/1999 | Aslanidis et al. | 6,029,892 A | 2/2000 | Miyake |
| 5,930,767 A | 7/1999 | Reber et al. | 6,032,136 A | 2/2000 | Brake et al. |
| 5,930,777 A | 7/1999 | Barber | 6,038,292 A | 3/2000 | Thomas |
| 5,931,917 A | 8/1999 | Nguyen et al. | 6,038,551 A | 3/2000 | Barlow et al. |
| 5,933,624 A | 8/1999 | Balmer | 6,038,584 A | 3/2000 | Balmer |
| 5,943,624 A | 8/1999 | Fox et al. | 6,041,308 A | 3/2000 | Walker et al. |
| 5,948,116 A | 9/1999 | Aslanidis et al. | 6,044,360 A | 3/2000 | Picciallo |
| 5,949,044 A | 9/1999 | Walker et al. | 6,047,888 A | 4/2000 | Dethloff |

| | | | | | | |
|---|---|---|---|---|---|---|
| 6,052,675 | A | 4/2000 | Checchio | 6,227,447 | B1 | 5/2001 | Campisano |
| 6,058,418 | A | 5/2000 | Kobata | 6,230,270 | B1 | 5/2001 | Laczko, Sr. |
| 6,061,344 | A | 5/2000 | Wood, Jr. | 6,232,917 | B1 | 5/2001 | Baumer et al. |
| 6,061,789 | A | 5/2000 | Hauser et al. | 6,233,230 | B1 | 5/2001 | Chan et al. |
| 6,064,320 | A | 5/2000 | dHont et al. | 6,233,683 | B1 | 5/2001 | Chan et al. |
| 6,064,981 | A | 5/2000 | Barni et al. | 6,237,848 | B1 | 5/2001 | Everett |
| 6,070,003 | A | 5/2000 | Gove et al. | 6,239,675 | B1 | 5/2001 | Flaxl |
| 6,070,150 | A | 5/2000 | Remington et al. | 6,240,187 | B1 | 5/2001 | Lewis |
| 6,070,154 | A | 5/2000 | Tavor et al. | 6,248,199 | B1 | 6/2001 | Smulson |
| 6,072,870 | A | 6/2000 | Nguyen et al. | 6,257,486 | B1 | 7/2001 | Teicher et al. |
| 6,073,840 | A | 6/2000 | Marion | 6,259,769 | B1 | 7/2001 | Page |
| 6,076,078 | A | 6/2000 | Camp et al. | 6,260,026 | B1 | 7/2001 | Tomida et al. |
| 6,078,888 | A | 6/2000 | Johnson, Jr. | 6,260,088 | B1 | 7/2001 | Gove et al. |
| 6,078,906 | A | 6/2000 | Huberman | 6,263,316 | B1 | 7/2001 | Khan et al. |
| 6,078,908 | A | 6/2000 | Schmitz | 6,264,106 | B1 | 7/2001 | Bridgelall |
| 6,081,790 | A | 6/2000 | Rosen | 6,266,754 | B1 | 7/2001 | Laczko, Sr. et al. |
| RE36,788 | E | 7/2000 | Mansvelt et al. | 6,267,292 | B1 | 7/2001 | Walker et al. |
| 6,088,683 | A | 7/2000 | Jalili | 6,269,348 | B1 | 7/2001 | Pare et al. |
| 6,088,686 | A | 7/2000 | Walker et al. | 6,273,335 | B1 | 8/2001 | Sloan |
| 6,088,717 | A | 7/2000 | Reed et al. | 6,282,522 | B1 | 8/2001 | Davis et al. |
| 6,088,797 | A | 7/2000 | Rosen | D447,515 | S | 9/2001 | Faenza, Jr. et al. |
| 6,092,057 | A | 7/2000 | Zimmerman et al. | 6,286,763 | B1 | 9/2001 | Reynolds et al. |
| 6,092,198 | A | 7/2000 | Lanzy et al. | 6,289,324 | B1 | 9/2001 | Kawan |
| 6,098,053 | A | 8/2000 | Slater | 6,293,462 | B1 | 9/2001 | Gangi |
| 6,098,879 | A | 8/2000 | Terranova | 6,315,193 | B1 | 11/2001 | Hogan |
| 6,101,174 | A | 8/2000 | Langston | 6,315,195 | B1 | 11/2001 | Ramachandran |
| 6,102,162 | A | 8/2000 | Teicher | 6,317,721 | B1 | 11/2001 | Hurta et al. |
| 6,102,672 | A | 8/2000 | Woollenweber | 6,318,636 | B1 | 11/2001 | Reynolds et al. |
| 6,105,008 | A | 8/2000 | Davis et al. | 6,323,566 | B1 | 11/2001 | Meier |
| 6,105,013 | A | 8/2000 | Curry et al. | 6,325,285 | B1 | 12/2001 | Baratelli |
| 6,105,865 | A | 8/2000 | Hardesty | 6,325,293 | B1 | 12/2001 | Moreno |
| 6,108,641 | A | 8/2000 | Kenna et al. | 6,326,934 | B1 | 12/2001 | Kinzie |
| 6,109,525 | A | 8/2000 | Blomqvist et al. | 6,327,573 | B1 | 12/2001 | Walker et al. |
| 6,112,152 | A | 8/2000 | Tuttle | 6,330,544 | B1 | 12/2001 | Walker et al. |
| 6,112,191 | A | 8/2000 | Burke | 6,332,193 | B1 | 12/2001 | Glass et al. |
| 6,115,360 | A | 9/2000 | Quay et al. | 6,336,095 | B1 | 1/2002 | Rosen |
| 6,115,458 | A | 9/2000 | Taskett | 6,342,844 | B1 | 1/2002 | Rozin |
| 6,116,423 | A | 9/2000 | Troxtell, Jr. et al. | 6,353,811 | B1 | 3/2002 | Weissman |
| 6,116,505 | A | 9/2000 | Withrow | 6,364,208 | B1 | 4/2002 | Stanford et al. |
| 6,118,189 | A | 9/2000 | Flaxl | 6,367,011 | B1 | 4/2002 | Lee et al. |
| 6,121,544 | A | 9/2000 | Petsinger | 6,374,245 | B1 | 4/2002 | Park |
| 6,122,625 | A | 9/2000 | Rosen | 6,377,034 | B1 | 4/2002 | Ivanov |
| 6,123,223 | A | 9/2000 | Watkins | 6,378,073 | B1 | 4/2002 | Davis et al. |
| 6,125,352 | A | 9/2000 | Franklin et al. | 6,388,533 | B2 | 5/2002 | Swoboda |
| 6,129,274 | A | 10/2000 | Suzuki | 6,390,375 | B2 | 5/2002 | Kayanakis |
| 6,133,834 | A | 10/2000 | Eberth et al. | 6,400,272 | B1 | 6/2002 | Holtzman et al. |
| 6,141,651 | A | 10/2000 | Riley et al. | 6,402,026 | B1 | 6/2002 | Schwier |
| 6,141,752 | A | 10/2000 | Dancs et al. | 6,402,028 | B1 | 6/2002 | Graham, Jr. et al. |
| 6,163,771 | A | 12/2000 | Walker et al. | 6,411,611 | B1 | 6/2002 | Van der Tuijn |
| 6,167,236 | A | 12/2000 | Kaiser et al. | 6,415,978 | B1 | 7/2002 | McAllister |
| 6,173,269 | B1 | 1/2001 | Sokol | 6,422,464 | B1 | 7/2002 | Terranova |
| 6,173,272 | B1 | 1/2001 | Thomas et al. | 6,424,029 | B1 | 7/2002 | Giesler |
| 6,177,860 | B1 | 1/2001 | Cromer et al. | RE37,822 | E | 8/2002 | Anthonyson |
| 6,179,205 | B1 | 1/2001 | Sloan | 6,427,910 | B1 | 8/2002 | Barnes et al. |
| 6,179,206 | B1 | 1/2001 | Matsumori | 6,438,235 | B2 | 8/2002 | Sims, III |
| 6,188,994 | B1 | 2/2001 | Egendorf | 6,439,455 | B1 | 8/2002 | Everett et al. |
| 6,189,787 | B1 | 2/2001 | Dorf | 6,442,532 | B1 | 8/2002 | Kawan |
| 6,192,255 | B1 | 2/2001 | Lewis et al. | 6,445,794 | B1 | 9/2002 | Shefi |
| 6,198,728 | B1 | 3/2001 | Hulyalkar et al. | 6,457,996 | B1 | 10/2002 | Shih |
| 6,198,875 | B1 | 3/2001 | Edenson et al. | 6,466,804 | B1 | 10/2002 | Pecen et al. |
| 6,202,927 | B1 | 3/2001 | Bashan et al. | 6,473,500 | B1 | 10/2002 | Risafi et al. |
| 6,205,151 | B1 | 3/2001 | Quay et al. | 6,480,100 | B1 | 11/2002 | Frieden et al. |
| 6,206,293 | B1 | 3/2001 | Gutman et al. | 6,480,101 | B1 | 11/2002 | Kelly et al. |
| 6,213,390 | B1 | 4/2001 | Oneda | 6,481,621 | B1 | 11/2002 | Herrendoerfer et al. |
| 6,215,437 | B1 | 4/2001 | Schurmann et al. | 6,481,632 | B2 | 11/2002 | Wentker et al. |
| 6,216,219 | B1 | 4/2001 | Cai et al. | 6,483,427 | B1 | 11/2002 | Werb |
| 6,219,439 | B1 | 4/2001 | Burger | 6,483,477 | B1 | 11/2002 | Plonka |
| 6,220,510 | B1 | 4/2001 | Everett et al. | 6,483,929 | B1 | 11/2002 | Murakami et al. |
| 6,222,914 | B1 | 4/2001 | McMullin | 6,484,937 | B1 | 11/2002 | Devaux et al. |
| D442,627 | S | 5/2001 | Webb et al. | 6,490,443 | B1 | 12/2002 | Freeny, Jr. |
| D442,629 | S | 5/2001 | Webb et al. | 6,491,229 | B1 | 12/2002 | Berney |
| 6,223,984 | B1 | 5/2001 | Renner et al. | 6,494,380 | B2 | 12/2002 | Jarosz |
| 6,226,382 | B1 | 5/2001 | MRaihi | 6,507,762 | B1 | 1/2003 | Amro et al. |

| | | |
|---|---|---|
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,589,119 B1 | 7/2003 | Orus et al. |
| 6,598,024 B1 | 7/2003 | Walker et al. |
| 6,608,995 B1 | 8/2003 | Kawasaki et al. |
| 6,609,655 B1 | 8/2003 | Harrell |
| 6,623,039 B2 | 9/2003 | Thompson et al. |
| 6,626,356 B2 | 9/2003 | Davenport et al. |
| 6,628,961 B1 | 9/2003 | Ho et al. |
| 6,629,591 B1 | 10/2003 | Griswold et al. |
| 6,636,833 B1 | 10/2003 | Flitcroft et al. |
| 6,650,887 B2 | 11/2003 | McGregor et al. |
| 6,662,166 B2 | 12/2003 | Pare et al. |
| 6,665,405 B1 | 12/2003 | Lenstra |
| 6,669,086 B2 | 12/2003 | Abdi et al. |
| 6,671,358 B1 | 12/2003 | Seidman et al. |
| 6,674,786 B1 | 1/2004 | Nakamura et al. |
| 6,679,427 B1 | 1/2004 | Kuroiwa |
| 6,681,328 B1 | 1/2004 | Harris et al. |
| 6,684,269 B2 | 1/2004 | Wagner |
| 6,687,714 B1 | 2/2004 | Kogen et al. |
| 6,690,930 B1 | 2/2004 | Dupre |
| 6,693,513 B2 | 2/2004 | Tuttle |
| 6,703,918 B1 | 3/2004 | Kita |
| 6,705,530 B2 | 3/2004 | Kiekhaefer |
| 6,711,262 B1 | 3/2004 | Watanen |
| 6,732,936 B1 | 5/2004 | Kiekhaefer |
| 6,742,120 B1 | 5/2004 | Markakis et al. |
| 6,747,546 B1 | 6/2004 | Hikita et al. |
| 6,760,581 B2 | 7/2004 | Dutta |
| 6,769,718 B1 | 8/2004 | Warther et al. |
| 6,771,981 B1 | 8/2004 | Zalewski et al. |
| 6,789,012 B1 | 9/2004 | Childs et al. |
| 6,834,270 B1 | 12/2004 | Pagani et al. |
| 6,851,617 B2 | 2/2005 | Saint et al. |
| 6,853,087 B2 | 2/2005 | Neuhaus et al. |
| 6,853,894 B1 | 2/2005 | Kolls |
| 6,853,987 B1 | 2/2005 | Cook |
| 6,857,566 B2 | 2/2005 | Wankmueller |
| 6,859,672 B2 | 2/2005 | Roberts et al. |
| 6,895,310 B1 | 5/2005 | Kolls |
| 6,994,262 B1 | 2/2006 | Warther |
| 7,003,501 B2 | 2/2006 | Ostroff |
| 7,069,444 B2 | 6/2006 | Lowensohn et al. |
| 7,096,204 B1 | 8/2006 | Chen et al. |
| 7,100,821 B2 | 9/2006 | Rasti |
| 7,103,575 B1 * | 9/2006 | Linehan .................. 705/64 |
| 7,136,835 B1 | 11/2006 | Flitcroft et al. |
| 7,213,748 B2 | 5/2007 | Tsuei et al. |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0034720 A1 | 10/2001 | Armes |
| 2001/0039617 A1 | 11/2001 | Buhrlen et al. |
| 2001/0049628 A1 | 12/2001 | Icho |
| 2002/0011519 A1 | 1/2002 | Shults |
| 2002/0026419 A1 | 2/2002 | Maritzen et al. |
| 2002/0028704 A1 | 3/2002 | Bloomfield et al. |
| 2002/0035548 A1 | 3/2002 | Hogan et al. |
| 2002/0046341 A1 | 4/2002 | Kazaks et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095298 A1 | 7/2002 | Ewing |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0111917 A1 | 8/2002 | Hoffman et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0154795 A1 | 10/2002 | Lee et al. |
| 2002/0166891 A1 | 11/2002 | Stoutenburg et al. |
| 2002/0174067 A1 | 11/2002 | Hoffman et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | DArbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0018567 A1 | 1/2003 | Flitcroft et al. |
| 2003/0025600 A1 | 2/2003 | Blanchard |
| 2003/0028481 A1 | 2/2003 | Flitcroft et al. |
| 2003/0046228 A1 | 3/2003 | Berney |
| 2003/0054836 A1 | 3/2003 | Michot |
| 2003/0055727 A1 | 3/2003 | Walker et al. |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0130820 A1 | 7/2003 | Lane, III |
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195037 A1 * | 10/2003 | Vuong et al. ............... 463/29 |

| | | | |
|---|---|---|---|
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0006539 A1 | 1/2004 | Royer et al. |
| 2004/0010462 A1 | 1/2004 | Moon et al. |
| 2004/0015451 A1 | 1/2004 | Sahota et al. |
| 2004/0016796 A1 | 1/2004 | Hann et al. |
| 2004/0020982 A1 | 2/2004 | Hoffman et al. |
| 2004/0029569 A1 | 2/2004 | Khan et al. |
| 2004/0030601 A1 | 2/2004 | Pond et al. |
| 2004/0039814 A1 | 2/2004 | Crabtree et al. |
| 2004/0039860 A1 | 2/2004 | Mills et al. |
| 2004/0044627 A1 | 3/2004 | Russell et al. |
| 2004/0083184 A1 | 4/2004 | Tsuei et al. |
| 2004/0139021 A1 | 7/2004 | Reed et al. |
| 2005/0017068 A1 | 1/2005 | Zalewski et al. |
| 2005/0038718 A1 | 2/2005 | Barnes et al. |
| 2005/0040272 A1 | 2/2005 | Argumedo et al. |
| 2005/0119978 A1 | 6/2005 | Ates |
| 2005/0121512 A1 | 6/2005 | Wankmueller |

FOREIGN PATENT DOCUMENTS

| | | |
|---|---|---|
| EP | 0 358 525 A2 | 3/1990 |
| EP | 0 484 726 A1 | 10/1990 |
| EP | 0 424 726 A1 | 5/1991 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |
| EP | 1 199 684 | 4/2002 |
| EP | 1 251 450 A1 | 10/2002 |
| GB | 2347537 | 9/2000 |
| GB | 2 361 790 A | 10/2001 |
| JP | 2000-11109 A | 1/2000 |
| JP | 2000-015288 A | 1/2000 |
| JP | 2000-40181 A | 2/2000 |
| JP | 2000-067312 | 3/2000 |
| JP | 2000-207641 | 7/2000 |
| JP | 2001-5931 A | 1/2001 |
| JP | 2001-283122 A | 10/2001 |
| WO | WO 95/32919 | 12/1995 |
| WO | 97/09688 A3 | 3/1997 |
| WO | WO 99/03057 A1 | 1/1999 |
| WO | 99/49424 A1 | 9/1999 |
| WO | WO 00/10144 A1 | 2/2000 |
| WO | WO 00/38088 | 6/2000 |
| WO | 00/49586 A1 | 8/2000 |
| WO | WO 01/04825 A1 | 1/2001 |
| WO | WO 01/15098 A1 | 3/2001 |
| WO | WO 01/43095 | 6/2001 |
| WO | WO 01/72224 A1 | 10/2001 |
| WO | WO 01/77856 | 10/2001 |
| WO | WO 01/80473 A2 | 10/2001 |
| WO | WO 01/86535 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 | 8/2002 |
| WO | WO 02/065246 | 8/2002 |
| WO | WO 02/065404 A2 | 8/2002 |
| WO | WO 02/069221 | 9/2002 |
| WO | WO 02/073512 A1 | 9/2002 |
| WO | WO 02/086665 A2 | 10/2002 |
| WO | WO 02/091281 A2 | 11/2002 |
| WO | WO 02/097575 A2 | 12/2002 |
| WO | WO 02/101670 A2 | 12/2002 |
| WO | 03/007623 A3 | 1/2003 |

OTHER PUBLICATIONS

International Search Report and Written Opinion of the International Searching Authority, PCT/US05/26067, May 23, 2007.
International Search Report and Written Opinion of the International Searching Authority, PCT/US05/26101, May 13, 2008.
Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.
Kulkarni, et al., "Biometrics: Speaker Verification"http://biometrics.cse.msu.edu/speaker.html, Mar. 8, 2004, 5 pages.
Kuntz, Mary, "Credit Cards as Good as Gold", Forbes, Nov. 4, 1985.
Lahey, Liam, "Microsoft Bolsters Rebate Structure", Computer Dealer News, Feb. 8, 2002.
Lamond, "Credit Card Transactions Real World and Online"© 1996.
Luettin, "Visual Speech and Speaker Recognition", http://herens.idiap.ch/~luettin/luettin-thesis.bib.abs.html, Jun. 30, 2000, 1 page.
Martin, Zack, One-Time Numbers Stop Web Hackers From Pilfering Data, Card Marketing, Thomson Financial, www.cardforum.com/html/cardmark/jan01__c3.htm, Jan. 2001.
McPerson, "The Evolution of Mobile Payment", Financial Insights, http://www.banktech.com/story/news/showArticle.jhtml?articleID=17601432, Feb. 2, 2004, 2 pages.
Nyman, Judy, "Free Income Tax Clinics are Opening as April 30 Deadline Draws Nearer", The Toronto Star, Final Edition, Mar. 25, 1986.
Obel, Michael, "Oil Companies Push Marketing, Cost Cutting to Fortify Earnings", Oil & Gas Journal, Sep. 16, 1985.
Roberti, "TI Embraces Prox Card Standard", http://www.ti.com/tiris/docs/news/in__the__News/2003/3-6-03.shtml, Mar. 6, 2003, 2 pages.
Rohde, "Microsoft, IBM and Phillips Test RFID Technology", IDG New Service, http://www.computerweekly.com/Article127889.htm, Feb. 9, 2004, 3 pages.
Ross et al., "Biometrics: Hand Geometry", http://biometrics.cse.msu.msu.edu/hand__geometry.html, Feb. 26, 2004, 2 pages.
Schmuckler, Eric, "Playing Your Cards Right", Forbes, Dec. 28, 1987.
Sony, Philips to Test RFID Platform, RFID Journal, May 8, 2003, 2 pages.
Wilson, "Putting Their Finger on It", http://sanfrancisco.bizjournals.com/sanfrancisco/stories/2003/10/20story6.html?t =printable, Feb. 9, 2004, 2 pages.
"Core One Credit Union—Discover the Advantage", http://coreone.org/2visa.html, Copyright 2001, (Last Visited Oct. 9, 2002)
"The Bank Credit Card Busines", American Bankers Association, 1996, all pages.
"Credit Card Offer Travelers New Benefit", PR Newswire, Aug. 5, 1987.
"Fingerprint Analysis—The Basics", http://www.crimtrac.gov.au/fingerprintanalysis.htm, Feb. 18, 2004, 3 pages.
"Fingerprint Technology—Indentix Inc.—Empowering Identification™—Understanding Biometrics", http://www.indentix.com/newsroom/news_biometrics_finger.html, Feb. 18, 2004, 1 page.
"Individual Biometric—Facial Recognition", http://ctl.ncsc.dni.us/biomet%20web/Bmfacial.html, Feb. 18, 2004, 2 pages.
"Individual Biometric—Fingerprint", http://ctl.ncsc.dni.us/biomet%20web/BMFingerprint.html, Feb. 18, 2004, 3 pages.
"Individual Biometric—Hand Geometry", http://ctl.ncsc.dni.us/biomet%20web/BMHand.html, Feb. 18, 2004, 2 pages.
"Individual Biometric—Iris Scan", http://ctl.ncsc.dni.us/biomet%20web/BMIris.html, Feb 18, 2004, 2 pages.

"Individual Biometric—Retinal Scan", http://ctl.ncsc.dni.us/biomet%20web/BMRetinal.html, Feb. 18, 2004, 2 pages.

"Individual Biometric—Vascular Patterns", http://ctl.ncsc.dni.us/biomet%20web/BMVascular.html, Feb. 18, 2004, 1 page.

"International Biometric Group—Signature Biometrics: How it Works", http://www.ibgweb.com/reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"ISO Magnetic Strip Card Standards", http://www.cyberd.co.uk/support/technotes/isocards.htm, Feb. 9, 2004, 4 pages.

"New Evidence about Positive Three-Tier Co-pay Performance Presented at Express Scripts 2000 Outcomes Conference", PR Newswire Association, Inc., Jun. 28, 2000.

"Pay by Touch—Press Releases", http://www.paybytouch.com/press/html, Feb. 10, 2004, 3 pages.

"Paying It by Ear", The Guardian http://money.guardian.co.uk/creditanddebt/creditcards/story/0,1456,876908,00.html, Jan. 18, 2003, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.

"Prestige Credit Cards: Those Pricey Plastics", Changing Times, Apr. 1986.

"Shell Introduces Optional Credit Card", The Associated Press, Sep. 3, 1985.

"Shell Introducing Expanded 'Signature' Credit Card", Tulsa Business Chronicle, Sep. 5, 1985.

"Shell-Oil: Introduces Shell Signature Travel and Entertainment Credit Card", Business Wire, Sep. 3, 1985.

"Smart Card Developer's Kit: Some Basic Standards for Smart Card", http: unix.be.eu.org/docs/smart-card-developer-kit/ch03/033-035.html, Feb. 9, 2004, 2 pages.

"The Chase Manhattan Bank Today Announced a Comprehensive Program to Enhance the Value of All its Credit Cards", PR Newswire, Dec. 18, 1986.

"The Henry Classification System", International Biometric Group, 7 pages.

American Express to offer disposable credit card numbers, CNN.com. U.S. News, www.cnn.com/2000/US/09/08/online.payments.ap/, Sep. 8, 2000.

Bonsor, "How Facial Recognition Systems Work", http://computer.howstuffworks.com/facial-recognition.htm/printable, Feb. 18, 2004, 6 pages.

Bowman, "Everything You Need to Know About Biometrics", Identix Corporation, Jan. 2008, 8 pages.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy of CardRatings.org, The Dollar Stretcher, www.stretcher.com/stories/01/010212e.cfm, Jan. 2001.

Docmemory, RFID Takes Priority With Wal-Mart, http://www.simmtester.com/page/news/shownews.asp?num=6650, Feb. 9, 2004, 2 pages.

Evers, "Judge Dismisses FTC Suite Against Rambus", IDG New Service, http://www.infoworld.com/article/04/02/18/HNjudgedismisses_1.html, Feb. 18, 2004, 3 pages.

Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.

Greene, Thomas C., American Express offers temporary CC numbers for the Web, The Register, www.theregister.com.uk/content/1/13132.html, Sep. 9, 2000.

Harris, "How Fingerprint Scanners Work", http://computer.howstuffworks.com/fingerprint-scanner.htm/printable, Feb. 18, 2004, 6 pages.

http://www.palowireless.com/infotooth/tutorial.asp, Apr. 28, 2003.

http://www.palowireless.com/infotooth/tutorial/12cap.asp, Apr. 28, 2003.

http://www.palowireless.com/infotooth/tutorial/baseband.asp, Apr. 28, 2003.

http://www.palowireless.com/infotooth/tutorial/hci.asp, Apr. 28, 2003.

http://www.palowireless.com/infotooth/tutorial/lmp.asp, Apr. 28, 2003.

http://www.palowireless.com/infotooth/tutorial/k1_gap.asp, Apr. 28, 2003.

http://www.palowireless.com/infotooth/tutorial/profiles.asp, Apr. 28, 2003.

http://www.palowirelss.com/infotooth/tutorial/radio.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/whatis.asp, Apr. 28, 2003.

http://www.semiconductors.philips.com/news/content/file_878.html, 04/072003.

Hurley et al., "Automatic Ear Recognition by Force Field Transformations", The Institution of Electrical Engineers, 2000, pp. 7/1-7/5.

Korotkaya, "Biometric Person Authentication: Odor", Department of Information Technology, Laboratory of Applied Mathematics, Lappeenranta University of Technology, Nov. 17, 2003, 18 pages.

Pay By Touch—Company, http://www.paybytouch.com/company.html, Feb. 2, 2004, 2 pages.

"Identix Inc.—Empowering Identification™—Understanding Biometrics", http://www.identix.com/newsroom/news_biometrics_face.html, Oct. 17, 2002, 2 pages.

American Express, Private Payments SM: A New Level of Security from American Express, American Express Website, Cards, Aug. 22, 2001, 1 page.

"What's New: Timex Watch Features Speedpass System", http://www.speedpass.com/news/article.jsp?id=51 (1 page).

"Physical Reality: A Second Look", Ken Sharp, Senior Technical Editor, http://www.idsystems.com/reader/1999_03/phys0399_pt2/phys0399_pt2.htm (6 pages).

"'Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", Jun. 4, 2002 http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/0301 10hnspot.xml?s=IDGNS (3 pages).

"Microsoft: See SPOT Run On Your Wrist", by Richard Shim, Jun. 5, 2003, http://www.news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its Quick Wave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 20003.

"RFID Smart Cards Gain Ground: The convenience of contactless transactions is driving widespread adoption of contactless smart cards", RFID Journal, Apr. 9, 2003.

"TI Embarces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 IC S50, Philips Semiconductors, Product Specification Rev. 5.1 May 2001.

\* cited by examiner

METHODS AND APPARATUS FOR A SECURE PROXIMITY INTEGRATED CIRCUIT CARD TRANSACTIONS

CROSS REFERENCE TO RELATED APPLICATIONS

This invention claims priority to U.S. patent application Ser. No. 10/192,488, entitled "SYSTEM AND METHOD FOR RFID PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, entitled "SYSTEM AND METHOD FOR RFID PAYMENTS," FILED Jul. 10, 2001), to U.S. Provisional Patent Application No. 60/396,577, entitled "SYSTEM AND METHOD FOR PAYMENT USING RADIO FREQUENCY IDENTIFICATION IN CONTACT AND CONTACTLESS TRANSACTIONS," filed on Jul. 16, 2002, and to U.S. patent application Ser. No. 10/340,352, entitled "SYSTEM AND METHOD FOR INCENTING PAYMENT USING RADIO FREQUENCY INDENTIFICATION IN CONTACT AND CONTACTLESS TRANSACTIONS," filed Jan. 10, 2003, all of which are incorporated herein by reference.

FIELD OF INVENTION

The present invention relates generally to the use of integrated circuit cards, or "smartcards," for completing transactions and, more particularly, to methods and apparatus for secure data transfer between a smartcard and a merchant system.

BACKGROUND OF INVENTION

Companies that provide transaction accounts for purchasing goods and services are constantly looking for ways to increase the number of consumers using the companies" services. One way to encourage consumer use is ensure that consumer's shopping experience is pleasant and convenient. Many efforts for enhancing the convenience of the shopping experience focus on the speed at which the transaction is completed. The faster the transaction is completed, the more pleasant and convenient the shopping experience for the consumer. This need for speed has resulted in the development of payment devices designed to replace conventional credit cards and checks, the use of which results in a transaction dependent upon the alacrity of the persons involved in the transaction. For example, conventional credit cards and checks often must be temporarily relinquished, for example, to a cashier for transaction completion, and the transaction is completed only as quickly as the cashier moves.

The more recently developed payment devices do not have to be relinquished since the payment devices are capable of completing a transaction in a contactless environment. Particularly, the consumer may maintain control of the payment device during completion of the entire transaction since the payment device does not have to be "swiped" or inserted in a card reader to be read (e.g., data stored on the card is retrieved). This is, in turn, removes the need for handing over the payment device to a cashier who ordinarily increases the time for transaction completion.

One type of payment device that has become popular for use in speeding up a transaction is the integrated circuit card, or "smartcard." The term "smartcard" refers generally to wallet-sized or smaller payment devices incorporating a microprocessor or microcontroller to store and manage data within the card. More complex than magnetic-stripe and stored-value cards, smartcards are characterized by sophisticated memory management and security features. A typical smartcard includes a microcontroller embedded within the card plastic which is electrically connected to an array of external contacts provided on the card exterior. A smartcard microcontroller generally includes an electrically-erasable and programmable read only memory (EEPROM) for storing user data, random access memory (RAM) for scratch storage, and read only memory (ROM) for storing the card operating system. Relatively simple microcontrollers are adequate to control these functions. Thus, it is not unusual for smartcards to utilize 8-bit, 5 MHZ microcontrollers with about 8K of EEPROM memory (for example, the Motorola 6805 or Intel 8051 microcontrollers).

A number of standards have been developed to address general aspects of integrated circuit cards, e.g.: ISO 7816-1, Part 1: Physical characteristics (1987); ISO 7816-2, Part 2: Dimensions and location of the contacts (1988); ISO 7816-3, Part 3: Electronic signals and transmission protocols (1989, Amd. 1 1992, Amd. 2 1994); ISO 7816-4, Part 4: Inter-industry commands for interchange (1995); ISO 7816-5, Part 5: Numbering system and registration procedure for application identifiers (1994, Amd. 1 1995); ISO/IEC DIS 7816-6, Inter-industry data elements (1995); ISO/IEC WD 7816-7, Part 7: Enhanced inter-industry commands (1995); and ISO/IEC WD 7816-8, Part 8: Inter-industry security architecture (1995). These standards are hereby incorporated by reference. Furthermore, general information regarding magnetic stripe cards and chip cards can be found in a number of standard texts, e.g., Zoreda & Oton, "Smart Cards" (1994), and Rankl & Effing, "Smart Card Handbook" (1997), the contents of which are hereby incorporated by reference.

Another payment device that is becoming more popular for use in speeding up a transaction uses Radio Frequency Identification (RFID) technology for data transfer. Of late, companies are increasingly embodying RFID data acquisition technology in a fob, tag or other similar form factor for use in completing financial transactions. A typical fob includes a transponder and is ordinarily a self-contained device, which may be contained on any portable form factor. In some instances, a battery may be included with the fob to power the transponder, in which case, the internal circuitry of the fob (including the transponder) may draw its operating power from the battery power source. Alternatively, the fob may exist independent of an internal power source. In this instance the internal circuitry of the fob (including the transponder) may gain its operating power directly from a RF interrogation signal. U.S. Pat. No. 5,053,774, issued to Schuermann, describes a typical transponder RF interrogation system, which may be found in the prior art. The Schuermann patent describes in general the powering technology surrounding conventional transponder structures. U.S. Pat. No. 4,739,328, issued to Koelle, et al., discusses a method by which a conventional transponder may respond to a RF interrogation signal. Other typical modulation techniques, which may be used, include, for example, ISO/IEC 14443 and the like.

In conventional fob powering technologies, the fob is typically activated upon presenting the fob in an interrogation signal. Alternatively, the fob may have an internal power source such that interrogation by the reader to activate the fob is not required. In either case, the fob does not have to be relinquished to a cashier, thereby speeding up transaction completion.

One of the more visible uses of the RFID technology is found in the introduction of Exxon/Mobil's Speedpass® and Shell's EasyPay® products. These products use transponders placed in a fob or tag, which enables automatic identification of the user when the fob is presented at a Point of Sale (POS) device. Fob identification data is typically passed to a third-party server database, where the identification data is referenced to a customer (e.g., user) credit or debit account.

One disadvantage with the conventional uses of the RFID technology is that conventional RFID devices may transmit only a limited amount of information (e.g., the device identifier) to the merchant system for processing. The advantage of transmitting data using Radio Frequency (RF), however, has not gone unnoticed. Some companies, such as American Express, have developed payment devices, which combine the integrated circuitry found in smartcard technology with the transponder powering technology found in conventional RFID devices. U.S. patent application Ser. No. 10/192,488, filed Jul. 9, 2002, entitled "SYSTEM AND METHOD FOR PAYMENT USING RADIO FREQUENCY IDENTIFICATION IN CONTACT AND CONTACTLESS TRANSACTIONS," incorporated herein by reference (incorporated herein by reference), teaches such a device.

FIG. 9 illustrates a block diagram of the many functional blocks of an exemplary RF operable payment device fob 902 which is taught in the '488 application. Fob 902 may be a RFID fob 902 which may be presented by the user to facilitate an exchange of funds or points, etc., for receipt of goods or services. As described herein, by way of example, the fob 902 may be a RFID fob, which may be presented for facilitating payment for goods and/or services.

Fob 902 may include an antenna 903 for receiving an interrogation signal from a RFID reader (not shown) via antenna 903 (or alternatively, via external antenna 918 in communication with a transponder 920). Fob antenna 903 may be in communication with a transponder 914. In one exemplary embodiment, transponder 914 may be a 13.56 MHz transponder compliant with the ISO/IEC 14443 standard, and antenna 903 may be of the 13 MHz variety. The transponder 914 may be in communication with a transponder compatible modulator/demodulator 906 configured to receive the signal from transponder 914 and configured to modulate the signal into a format readable by any later connected circuitry. Further, modulator/demodulator 906 may be configured to format (e.g., demodulate) a signal received from the later connected circuitry in a format compatible with transponder 914 for transmitting to RFID reader via antenna 903. For example, where transponder 914 is of the 13.56 MHz variety, modulator/demodulator 906 may be ISO/IEC 14443-2 compliant.

Modulator/demodulator 906 may be coupled to a protocol/sequence controller 908 for facilitating control of the authentication of the signal provided by RFID reader, and for facilitating control of the sending of the fob 902 account number. In this regard, protocol/sequence controller 908 may be any suitable digital or logic driven circuitry capable of facilitating determination of the sequence of operation for the fob 902 inner-circuitry. For example, protocol/sequence controller 908 may be configured to determine whether the signal provided by the RFID reader is authenticated, and thereby providing to the RFID reader the account number stored on fob 902.

Protocol/sequence controller 908 may be further in communication with authentication circuitry 910 for facilitating authentication of the signal provided by RFID reader. Authentication circuitry may be further in communication with a non-volatile secure memory database 912. Secure memory database 912 may be any suitable elementary file system such as that defined by ISO/IEC 7816-4 or any other elementary file system allowing a lookup of data to be interpreted by the application on the chip. The data may be used by protocol/sequence controller 908 for data analysis and used for management and control purposes, as well as security purposes. Authentication circuitry may authenticate the signal provided by RFID reader by association of the RFID signal to authentication keys stored on database 912. Encryption circuitry may use keys stored on database 912 to perform encryption and/or decryption of signals sent to or from the RFID reader.

In addition, protocol/sequence controller 908 may be in communication with a database 914 for storing at least a fob 902 account data, and a unique fob 902 identification code. Protocol/sequence controller 908 may be configured to retrieve the account number from database 914 as desired. Database 914 may be of the same configuration as database 912 described above. The fob account data and/or unique fob identification code stored on database 914 may be encrypted prior to storage. Thus, where protocol/sequence controller 908 retrieves the account data, and or unique fob identification code from database 914, the account number may be encrypted when being provided to RFID reader. Further, the data stored on database 914 may include, for example, an unencrypted unique fob 902 identification code, a user identification, Track 1 and Track 2 data, as well as specific application applets. In a typical transaction, a consumer may present the fob 902 to a merchant reader (not shown) for transaction completion. The merchant reader may receive information from the fob database 912, 914 to be transferred to the account issuer for transaction completion.

While use of the smartcard and RF technologies results in a faster and more convenient transaction, the method of data transfer between the payment device and the merchant system must be secured against fraud. As such, a need exists for a method of securing the transaction which does not increase the time needed to complete a transaction, and which method may be used without device user intervention.

SUMMARY OF INVENTION

The present invention provides methods and apparatus for transaction completion using a proximity integrated circuit payment device. The system includes a "smartcard" that may be operable to transmit data to a merchant system via RF. The smartcard is operable to indicate to the merchant system various transaction authorization methods and to provide authentication data without intervention from the smartcardholder.

The system of the present invention includes a smartcard in communication with a merchant smartcard or RF reader for communicating cardholder authentication and transaction authorization data. The merchant system is in communication with a transaction account issuer system, and optionally an alternate identification server, for transmitting transaction information and receiving transaction authorization, and for receiving transaction settlement. In a typical method according to the invention, the cardholder may provide a smartcard to a merchant system to permit the merchant system to read the data contained thereon. The merchant system may then select the appropriate processing application by matching the compatible transaction applications on the merchant system with those contained on the smartcard. The merchant system may then retrieve information from the smartcard, determine whether the application should be completed online or offline and whether there are transaction or usage restrictions placed on the transaction account. In determining whether to complete the transaction online or offline, the merchant system takes into consideration various merchant terminal risk factors defined by the merchant. During online transactions, the method contemplates the results of a smartcard risk factor analysis performed by the smartcard.

BRIEF DESCRIPTION OF DRAWINGS

The present invention will hereinafter be described in conjunction with the appended drawing figures, wherein like numerals denote like elements, and.

DETAILED DESCRIPTION

Figure 1:
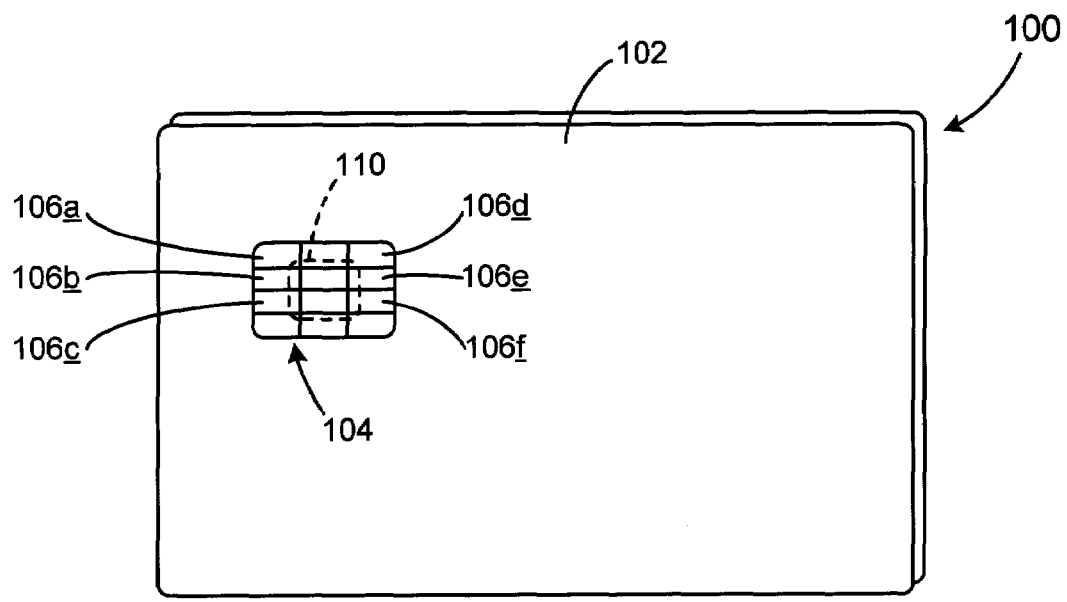
FIG. 1 illustrates an exemplary smartcard apparatus.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN).

Where required, the system user may interact with the system via any input device such as, a keypad, keyboard, mouse, kiosk, personal digital assistant, handheld computer (e.g., Palm Pilot®, Blueberry®), cellular phone, and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris, or the like. Moreover, although the invention may frequently be described as being implemented with TCP/IP communications protocol, it should be understood that the invention could also be implemented using SNA, IPX, Appletalk, IPte, NetBIOS, OSI, or any number of communications protocols. Moreover, the system contemplates, the use, sale, or distribution of any goods, services or information over any network having similar functionality described herein.

A transaction device identifier, as used herein, may include any identifier for a transaction device, which may be correlated to a user transaction account (e.g., credit, charge debit, checking, savings, reward, loyalty, or the like) maintained by a transaction account provider (e.g., payment authorization center). A typical transaction account identifier (e.g., account number) may be correlated to a credit or debit account, loyalty account, or rewards account maintained and serviced by such entities as American Express, Visa and/or MasterCard, or the like.

To facilitate understanding, the present invention may be described with respect to a credit account. However, it should be noted that the invention is not so limited and other accounts permitting an exchange of goods and services for an account data value is contemplated to be within the scope of the present invention.

A transaction device identifier may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and, etc. In this example, the last sixteenth digit is used as a sum check for the sixteen-digit number. The intermediary eight-to-ten digits are used to uniquely identify the customer. The account number may be stored as Track 1 and Track 2 data as defined in ISO/IEC 7813, and further may be made unique to the RFID transaction device.

In one exemplary embodiment, the transaction device identifier may include a unique RFID transaction device serial number and user identification number, as well as specific application applets. The transaction device identifier may be stored on a transaction device database located on the transaction device. The transaction device database may be configured to store multiple account numbers issued to the RFID transaction device user by the same or different account providing institutions. In addition, where the device identifier corresponds to a loyalty or rewards account, the RFID transaction device database may be configured to store the attendant loyalty or rewards points data.

The databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

In addition to the above, the transaction device identifier may be associated with any secondary form of identification configured to allow the consumer to interact or communicate with a payment system. For example, the transaction device identifier may be associated with, for example, an authorization/access code, personal identification number (PIN), Internet code, digital certificate, biometric data, and/or other secondary identification data used to verify a transaction device user identity.

It should be further noted that conventional components of RFID transaction devices and smartcards may not be discussed herein for brevity. For example, one skilled in the art will appreciate that the RFID transaction device and the RFID reader disclosed herein include traditional transponders, antennas, protocol sequence controllers, modulators/demodulators and the like, necessary for proper RFID data transmission. As such, those components are contemplated to be included in the scope of the invention.

Figure 9:
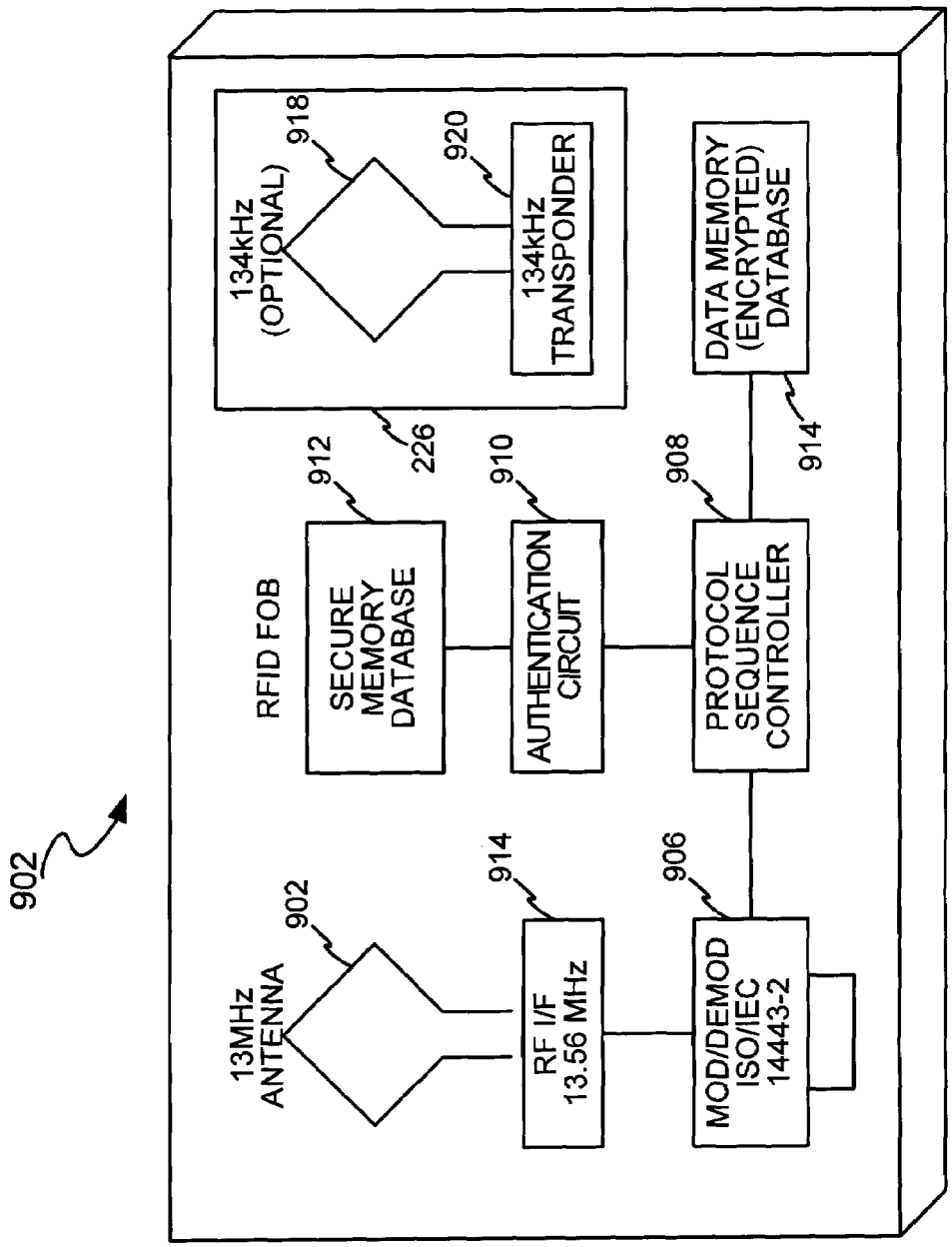
FIG. 9 illustrates an exemplary RF/RFID payment device useful in practicing the present invention.

It should also be noted that the present invention is described with respect to an integrated circuit card, such as, a smartcard, by way of example and not of limitation. That is, other integrated circuit card devices are contemplated to be within the scope of the invention. For example, the transaction device described with respect to FIG. 9 is useful for the present invention. Additionally, although the present invention is described with reference to a "card" the term card is used herein to refer to any integrated circuit transaction device containing an integrated circuit card payment application. That is, the term "card" is not limited by the size or shape of the form factor.

Figure 2:
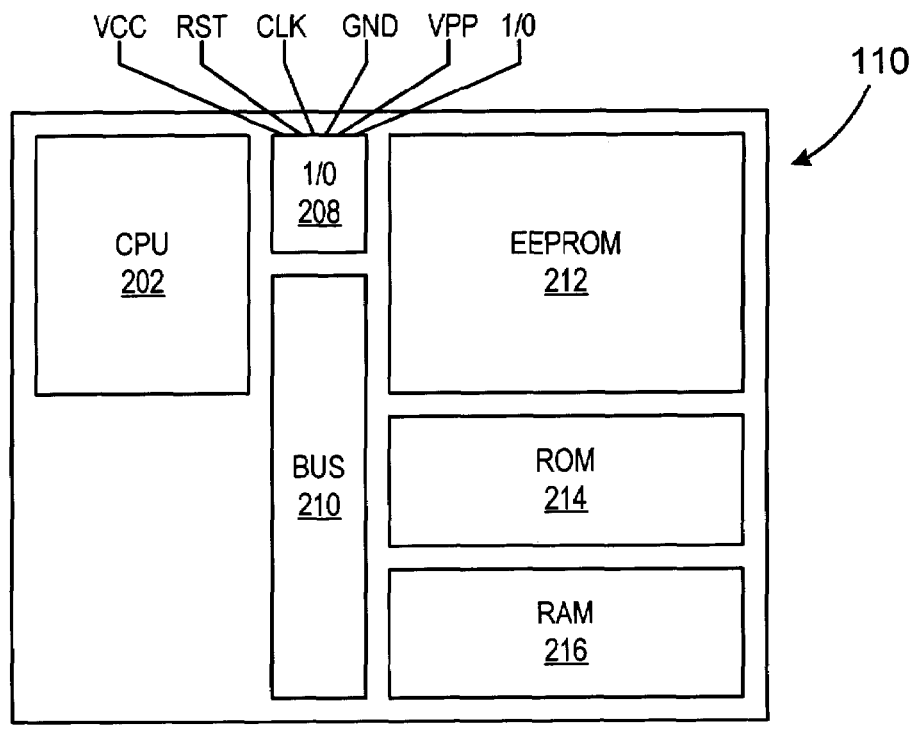
FIG. 2 is a schematic diagram of an exemplary smartcard integrated circuit, showing various functional blocks.

To facilitate an understanding of the invention, the general operation and structure of a smartcard useful with the invention is discussed. Referring now to FIGS. 1 and 2, an exemplary smartcard system suitable for practicing the present invention is shown. A smartcard 100 generally comprises a card body 102 having a communication region 104 for providing contact or non-contact communication between an external device (e.g., a card reader) and an integrated circuit 110 encapsulated within card body 102. Communication region 104 preferably comprises six conductive pads 106 whose placement and size conform to ISO7816-2. More particularly, a communication region 104 in conformance with ISO-7816-2 preferably comprises VCC contact 106(*a*) (power supply), RST contact 106(*b*) (reset), CLK contact 106(*c*) (external clock), GND Contact 106(*d*) (ground), VPP contact 106(*e*) (programming voltage), and I/O contact 106(*f*) (data line).

VCC 106(*a*) suitably provides power to IC 110 (typically 5.0 V+/−10%). CLK 106(*c*) is suitably used to provide an external clock source, which acts as a data transmission reference. RST 106(*b*) is suitably used to transmit a reset signal to IC 110 during the booting sequence. VPP contact 106(*e*) may be used for programming of EEPROM 212 in IC 110. As is known in the art, however, this contact is generally not used since modern ICs typically incorporate a charge pump suitable for EEPROM programming which takes its power from the supply voltage (VCC 106(*a*)). I/O 106(*f*) suitably provides a line for serial data communication with an external device, and GND 106(*d*) is suitably used to provide a ground reference. Encapsulated integrated circuit 110 is configured to communicate electrically with contacts 106 via any number of known packaging techniques, including, for example, thermosonically-bonded gold wires, tape automated bonding (TAB), and the like.

While an exemplary smartcard is discussed above in the context of a plurality of external contacts, it will be appreciated that contactless cards may also be utilized to practice this invention. That is, non-contact communication methods may be employed using such techniques as capacitive coupling, inductive coupling, and the like. As is known in the art, capacitive coupling involves incorporating capacitive plates into the card body such that data transfer with a card reader is provided through symmetric pairs of coupled surfaces, wherein capacitance values are typically 10-50 picofarads, and the working range is typically less than one millimeter. Inductive coupling employs coupling elements, or conductive loops, disposed in a weakly-coupled transformer configuration employing phase, frequency, or amplitude modulation. In this regard, it will be appreciated that the location of communication region 104 disposed on or within card 100 may vary depending on card configuration. For additional information regarding non-contact techniques, see, for example, contactless card standards ISO/IEC 10536 and ISO/IEC 14443, which are hereby incorporated by reference.

Smartcard body 102 may be manufactured from a sufficiently rigid material, which is resistant to various environmental factors (e.g., physical deterioration, thermal extremes, and ESD (electrostatic discharge)). Materials suitable in the context of the present invention include, for example, PVC (polyvinyl chloride), ABS (acrylonitrile-butadiene-styrol), PET (polyethylene terephthalate), or the like. In a preferred embodiment, chip card 100 conforms to the mechanical requirements set forth in ISO 7810, 7813, and 7816. Body 102 may comprise a variety of shapes, for example, the rectangular ID-1, ID-00, or ID-000 dimensions set forth in ISO-7810. In a preferred embodiment, body 102 is roughly the size and shape of a common credit card and substantially conforms to the ID-1 specification.

Referring now to FIG. 2, IC 110 preferably comprises regions for Random Access Memory (RAM) 216, ReadOnly Memory (ROM) 214, Central Processing Unit (CPU) 202, Data Bus (BUS) 210, Input/Output (I/O) 208, and Electrically-Erasable and Programmable Read Only Memory (EEPROM) 212.

RAM 216 comprises volatile memory, which is used by the card primarily for scratch memory (e.g., to store intermediate calculation results and data encryption processes). RAM 216 preferably comprises at least 256 bytes.

EEPROM 212 provides a non-volatile memory region which is erasable and rewritable electrically, and which is used to store, inter alia, user data, system data, and application files. In the context of the present invention, EEPROM 212 is suitably used to store a plurality of files related to cardholder information and/or preferences (discussed in greater detail below in conjunction with FIGS. 3-5). EEP-ROM 212 preferably comprises at least 8K bytes.

In a preferred embodiment, CPU 202 implements the instruction set stored in ROM 202, handles memory management (i.e., RAM 216 and EEPROM 212), and coordinates input/output activities (i.e., I/O 208).

ROM 214 preferably contains, or is "masked" with, the smartcard operating system (SCOS). That is, the SCOS is preferably implemented as hard-wired logic in ROM 214 using standard mask design and semiconductor processing methods well known in the art (e.g., photolithography, diffusion, oxidation, ion implantation, etc.). Accordingly, ROM 214 cannot generally be altered after fabrication. The purpose of such an implementation is to take advantage of the fast access times provided by masked ROMs. ROM 214 suitably comprises about 4K-20K bytes of memory, preferably at least 16K bytes. In this regard, it will be appreciated that alternate memory devices may be used in place of ROM 214. Indeed, as semiconductor technology progresses, it may be advantageous to employ more compact forms of memory, for example, flash-EEPROMs.

The SCOS controls information flow to and from the card, and more particularly facilitates storage and retrieval of data stored within EEPROM 212. As with any operating system, the SCOS operates according to a well-defined command set. In this regard, a variety of known smartcard operating systems are suitable for the purpose of this invention, for example, IBM's Multi-Function Card (MFC) Operating System 3.51, the specification of which is hereby incorporated by reference. While the IBM MFC operating system employs the standard tree structure of files and directories substantially in accordance with ISO7816-4 (as detailed below), it will be appreciated by those skilled in the art that other operating system models would be equally suitable for implementation of the present invention. Moreover, it may be advantageous to allow certain aspects of operating system functionality to exist outside the card (i.e., in the form of blocks of executable code) which can be downloaded and executed by the smartcard during a transaction (for example, Java applets, ActiveX objects, and the like).

Given the general characteristics of smartcard 100 as outlined above, it will be apparent that a wide range of microcontrollers and contact-based smartcard products known in the art may be used to implement various embodiments of the present invention. Suitable smartcards include, for example, the model ST16SF48 card, manufactured by SGS-Thomson Microelectronics, which incorporates a Motorola 6805 microcontroller with 16K ROM, 8K EEPROM, and 384 bytes of RAM. It will be appreciated, however, that particular embodiments of the present invention might require more advanced microcontrollers with greater EEPROM capacity (i.e., in the range of about 12-16K). Such systems are well known in the art.

Figure 3:
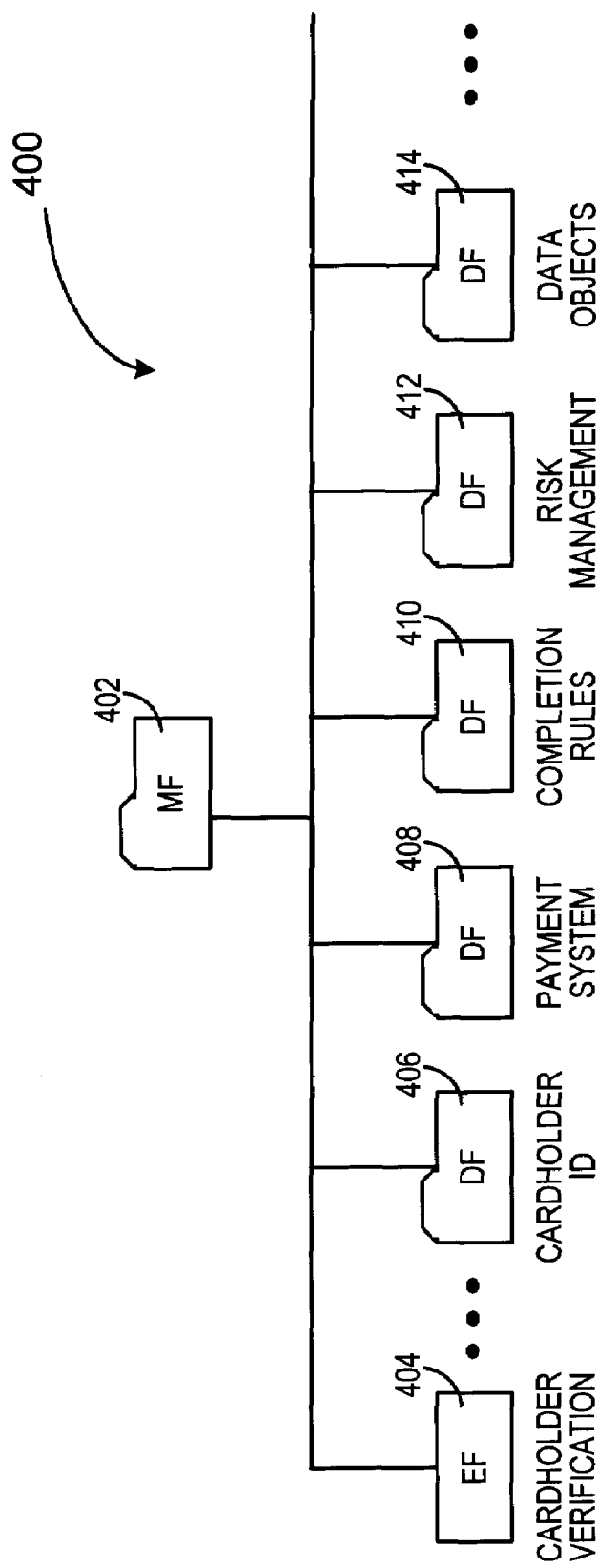
FIG. 3 is an exemplary diagram of files and directories arranged in a typical tree structure.

Having thus described an exemplary smartcard 100 and IC 110, an overview of a smartcard file structure in accordance with the present invention will now be described with respect to FIGS. 3-6. Referring now to FIG. 3, file structure 400 is preferably used to store information related to cardholder preferences and various data useful for securing transaction settlement and the like. More particularly, file structure 400 preferably comprises cardholder ID application 406, payment system application 408, transaction completion rules application 410, card risk management application 412, optional data objects application 414, and cardholder verification data 404. It will be appreciated by those skilled in the art that the term "application" in this context refers to self-contained regions of data all directed at a particular function (e.g., debit, credit card, automated teller, authentication, authorization etc.) rather than a block of executable software code, although the use of executable modules as part of any particular application falls within the scope of the present invention.

Cardholder verification data 404 preferably houses data useful in verifying cardholder identity during a transaction. In a preferred embodiment, cardholder verification data 404 comprises two eight-byte cardholder verification numbers (i.e., PIN numbers) referred to as CHV1 and CHV2.

Cardholder ID application 406 suitably comprises various files related to personal information of the cardholder (e.g., name, addresses, payment cards, driver's license, personal preferences and the like.

Payment system application 408 suitably comprises information useful in effecting commercial transactions (e.g., account number and expiration date information traditionally stored on a magnetic-stripe credit card). Alternatively, payment system application 408 comprises a full EMV-compliant application suitable for a wide range of financial transactions.

Transaction completion rules application 410 suitably comprises data helpful in determining if the conditions for completing a transaction have been met. Transaction completion rules application 410 may ordinarily contain information relevant to whether a requested service is permitted using the smartcard 100.

Card risk management application 412 suitably comprises information useful for validating that a transaction should be authorized, and for determining the authorization method. The card risk management application 412 may contain data objects relevant to the internal card usage velocity, issuer application data cryptographic data or the like.

Smartcard 100 may include various optional applications 414 and suitably comprises data useful in expediting the a transaction, including, for example, user preferences, application currency code, application version number, lower consecutive offline limits, upper consecutive offline limits, and the like.

In each of the above-mentioned applications, sophisticated access and encryption schemes are preferably utilized in order to allow multiple parties to make use of certain file structures while preventing unauthorized entry into others. More specifically, merchants (e.g., various distinct merchants) may create their own tailor-made file structures (i.e., "partner file structures") within card 100. Details of the various security measures employed are described in further detail below in conjunction with Table 40.

Figure 8:
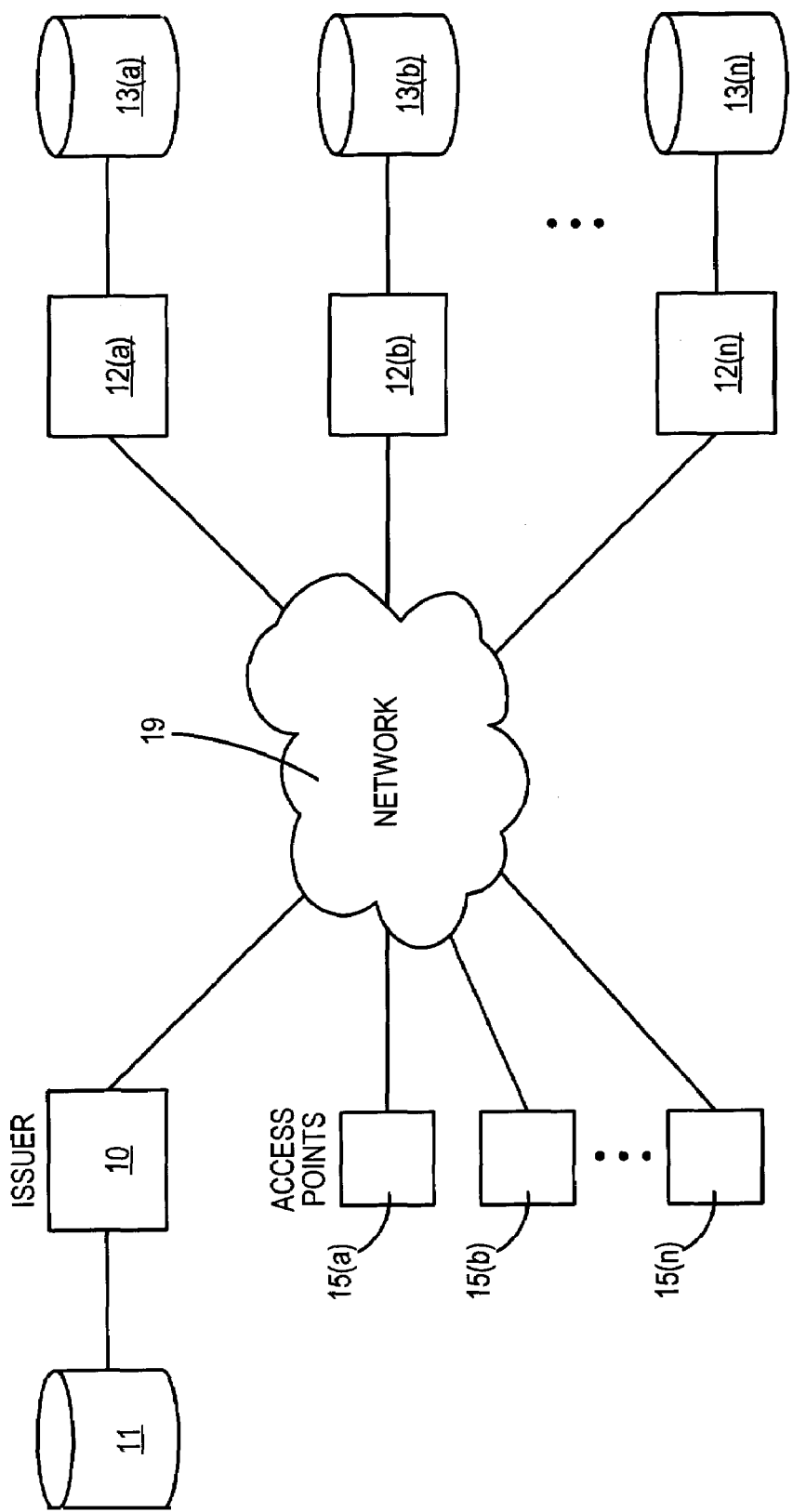
FIG. 8 illustrates an exemplary distributed transaction system useful in practicing the present invention.

Referring now to FIG. 8, smartcard 100 is suitably used in the context of a distributed transaction system. Briefly, cardholders may employ smartcard 100 at various access points 15 which are connected via network 19 to an issuer 10 and at least one merchant 12. Merchant server 12 and issuer 10 suitably comprise various hardware and software components suitable for client host communications as well as a merchant database system 13 and issuer database system 11. In this context, the term "issuer" refers to the organization that actually issues the smartcard and retains some high-level access to certain areas of file structure 400 (detailed below).

Merchants 12(*a*), 12(*b*), and so on, may comprise the various district merchant systems configured to receive data from a smartcard 100 for transaction completion. Each merchant 12 suitably comprises a database 13 and appropriate hardware and software components necessary for completing a transaction over network 19. Network 19 may comprise one or more communication modes, (e.g., the public switched telephone network (PSTN), the Internet, digital and analog wireless networks, and the like).

Each access point 15 suitably comprises an appropriate card reader for interfacing with smartcard 100 as well as hardware and software suitable for interfacing with a cardholder and performing a transaction over network 19. Access points 15 are preferably located in areas providing convenient access to a cardholder for transaction initiation and completion. Such access points 15 may be located, for example, in airline ticketing and gate areas, rental car facilities, hotel lobbies, travel agencies, and stand-alone kiosks in malls. Furthermore, an individual cardholder might configure his or her personal computer to act as an access point using appropriate software and peripheral hardware.

In a preferred embodiment of the present invention, data files and directories are stored in a "tree" structure as is known in the art. That is, the smartcard file structure resembles the well-known MS-DOS (Microsoft Disk Operating System) file structure wherein files are logically organized within a hierarchy of directories. Specifically, three types of files are defined in ISO 7816-4: dedicated files (DF), elementary files (EF), and a master file (MF). The master file is analogous to the MS-DOS "root" directory, and contains all other files and directories. Dedicated files are actually directories or "folders" for holding other DFs or EFs. Thus, MF 302 may contain an arbitrary number of DFs 306, and these DFs (e.g., DF 306(*a*)) may or may not contain other DFs (e.g., DF 308). Elementary files are used to store user data, and may exist within a dedicated file (e.g., EF 310 within DF 306(*a*)), or within the master file (e.g., EF 304 within MF 302). Higher level DFs (i.e., DFs which house particular applications) are often referred to as application dedicated files (ADFs).

The MF and each of the DFs and EFs are assigned a unique two-byte file identifier (FID). By convention, the MF is traditionally assigned an FID of "3F00" hex. Selection of an EF or DF by the operating system may then be performed by tracing its entire path starting at the MF. Thus, if the MF contains a DF with a FID "A100", and this DF in turn contains an EF with a FID "A101", then this EF could be referenced absolutely by successive selection of FIDs 3F00, A100, and A101. It will be appreciated that the FID is essentially a file name used by the operating system to select directories and files; it is not intended to indicate a physical address within EEPROM 212. As will be appreciated by those skilled in the art, low-level EEPROM addressing is preferably handled by the SCOS in conjunction with CPU 202.

Each file preferably has an associated file header containing various indicia of the particular EF, DF, or MF. More particularly, the file header associated with a particular file preferably includes the file identifier (FID), file size, access conditions, and file structure. In this regard, smartcard 100 suitably employs one of four file structures: transparent, linear fixed, linear variable, or cyclic. For the sake completeness, the nature of these file structures will be briefly reviewed.

A transparent file structure consists of a string of bytes accessed by specifying an offset and byte count. For example, with reference to Table 1 below, given an n-byte string of data, bytes 7 through 10 would be accessed using an offset of six and a length of four.

TABLE 1

Transparent file structure

| byte# | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | ... | ... n |
| ----------------------offset------------> | | | | | | <----------length----------> | | | | | | | | | |

A linear fixed file structure comprises a plurality of records of equal length (e.g., a list of phone numbers), wherein access to an individual record is achieved through reference to a record number. In addition, it is possible to refer to the "next" or "previous" record relative to the "current" record (i.e., the most recently accessed record). In contrast, a linear variable file structure comprises records of arbitrary but known length, and is therefore typically more compact than linear fixed data structures.

A cyclic file structure is a type of linear fixed file wherein a pointer is used to point to the last data set written to. After the last data record is written to, the pointer returns to the first record. That is, a cyclic file comprises a series of records arranged in a "ring." A data structure particularly important with regard to storing records as well as secure messaging in smartcard applications is the BER taglength-value or "TLV" structure in accordance with ISO/IEC 8825, hereby incorporated by reference. In a TLV object, information regarding the type and length of the information is included along with the actual data. Thus, a TLV object comprises a tag, which identifies the type of data (as called out by the appropriate specification), a length field, which indicates the length in bytes of the data to follow, and a value field, which comprises the primary data. For example, the TLV object illustrated in Table 2 below encodes the text "phoenix," which has a length of 7 bytes, and corresponds to a the "city" tag of "8C" hex (a hypothetical tag designation).

TABLE 2

Exemplary primitive TLV object

| Tag | Length | Value | | | | | | |
|---|---|---|---|---|---|---|---|---|
| '8C' | '07' | p | H | o | e | n | i | x |

It will be appreciated that the meaning of the various tag values must be known to the system a priori. That is, in order for the tag field to be useful, the smartcard and any external systems communicating with the smartcard must conform to the same tag specification. In this regard, ISO/IEC 7816-6 defines a series of tags useful in the context of the present invention, as does the IBM MFC 3.2 specification. ISO/IEC 8825 sets forth the basic encoding rules for a TLV system and defines a "template" data object, which can be used as a container for multiple TLV objects. That is, it is often advantageous to encapsulate primitive TLV objects within a larger template, which is itself, a TLV object.

In the detailed description to follow, various acronyms and abbreviations will be used to refer to particular data types, formats, and the like. A key to these acronyms and abbreviations is presented in Table 3 below.

TABLE 3

Key to acronyms

| | |
|---|---|
| AN | Alphanumeric |
| N | Numeric |
| B | Boolean |
| C | Convention |
| M | Matrix |
| D | Data |
| AR | Bits array |
| BIN | Binary |
| RJ | Right-justified |
| LJ | Left-justified |
| BCD | Binary coded decimal |

In the discussion that follows, the various features of a preferred data structure are in some cases described using particular file structure types (i.e., transparent, fixed, etc.). Those skilled in the art will realize, however, that any of the common smartcard file structure types are typically suitable for implementing any particular data structure. For example, when a file structure is described as including "a plurality of records," it will be understood that such a structure may be designed, for example, using a list of records assembled in a linear fixed file wherein each record is itself a transparent file (and offset values correspond to the various fields). Alternatively, such a structure may be designed using TLV strings assembled in a linear fixed file or within a larger template TLV. This is the case notwithstanding the fact that particular tag values which are for the most part arbitrary are not explicitly listed in the tables that follow.

Figure 4:
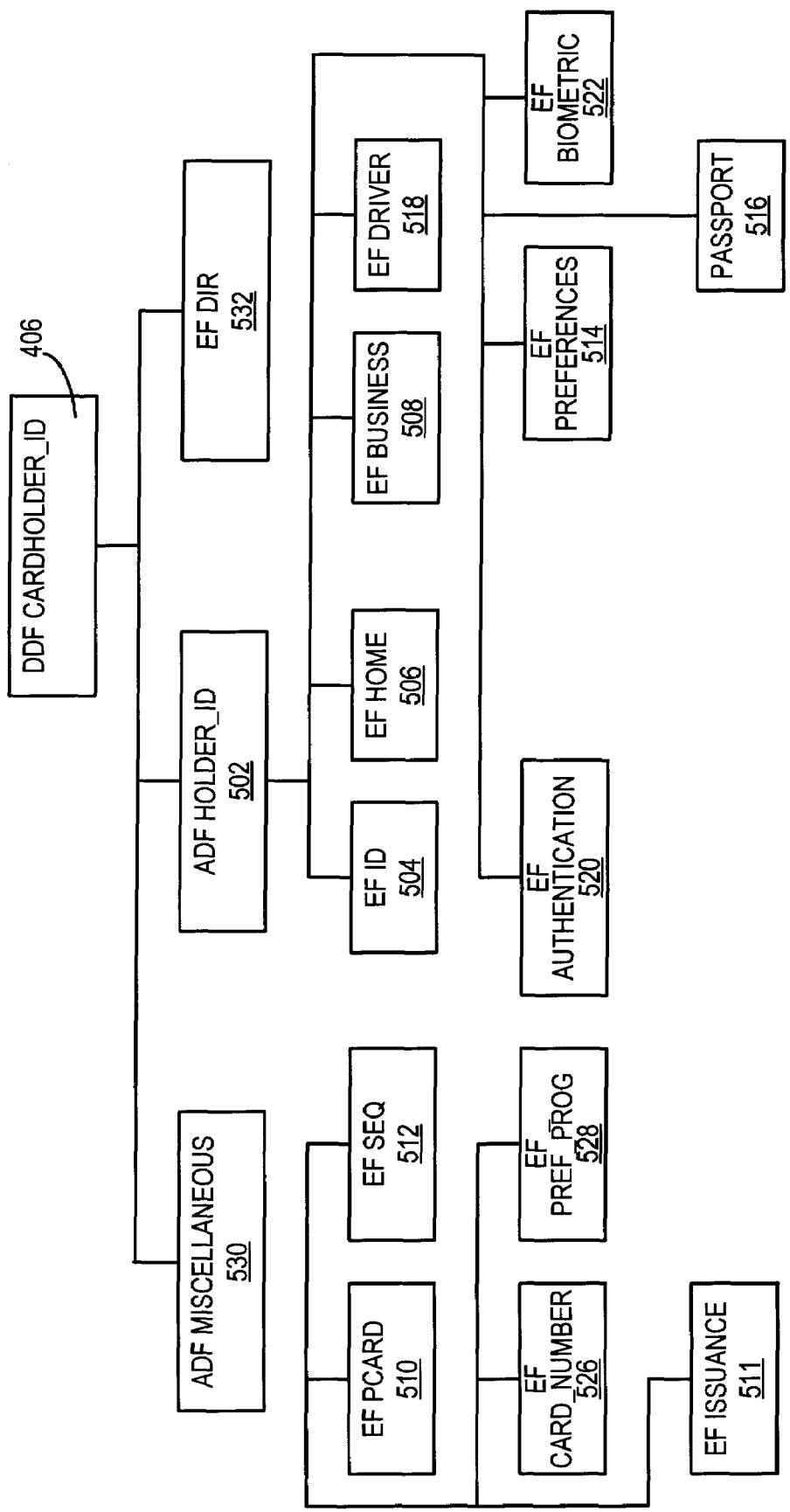
FIG. 4 sets forth an exemplary database structure in accordance with a preferred embodiment of the present invention.

Referring now to FIG. 4, Cardholder ID application 406 is used to store various information related to the cardholder. More particularly, cardholder ID application 406 preferably comprises directory EF 532, holder_ID DF 502 and miscellaneous DF 530. Holder_ID DF 502 preferably comprises ID EF 504, home EF 506, business EF 508, preferences EF 514, passport EF 516, authentication EF 520, biometric EF 522, and driver EF 518. Miscellaneous EF 530 preferably comprises payment card EF 510, sequence EF 512, issuance EF 511, preferred programs EF 528, and card number EF 526. These files and their respective functions are discussed in detail below.

Directory EF 532 provides a list of application identifiers and labels for the various high-level DF's existing under cardholder ID application 406. That is, this file serves the function of a high-level directory listing which specifies the location (i.e., FID) and application label for each DF in this case, holder_ID DF 502 and miscellaneous DF 530. In a particularly preferred embodiment, directory EF 532 is structured in accordance with EMV 3.0 as shown in Table 4 below. Preferably, each major application (e.g., hotel, airline, etc.) has an associated directory file with a substantially same file structure.

TABLE 4

Exemplary cardholder ID directory EF

| | External format | | Internal format(bytes) | |
|---|---|---|---|---|
| Record description | Size | Type | Size | Type |
| Application ID for holder_ID DF | 16 | AN | 16 | ASCII |
| Application label | 16 | AN | 16 | ASCII |
| Application ID for miscellaneous DF | 16 | AN | 16 | ASCII |
| Application label | 16 | AN | 16 | ASCII |

ID EF 504 preferably includes personal information related to the cardholder (e.g., name, date of birth, emergency contact, general preferences, and the like). In a particularly preferred embodiment, member EF 504 comprises the fields set forth in Table 5 below. Italicized field names indicate a subcategory within a particular field.

TABLE 5

Exemplary ID EF data structure

| | External format | | Internal format(bytes) | |
|---|---|---|---|---|
| | Size | Type | Size | Type |
| Record description | | | | |
| Last Name | 30 | AN | 30 | ASCII |
| First Name | 20 | AN | 20 | ASCII |
| Middle Name | 8 | AN | 8 | ASCII |
| Honorary Title | 8 | AN | 8 | ASCII |
| Name Suffix | 4 | AN | 4 | ASCII |
| Date of Birth | 8 | D | 4 | BCD |
| Social Security Number | 10 | AN | 10 | ASCII |
| Emergency Contact | | | | |
| Last Name | 20 | AN | 20 | ASCII |
| First Name | 10 | AN | 10 | ASCII |
| Relation | 1 | C | 1 | BIN |
| Phone | 20 | N | 10 | BCD |
| Gender | 1 | AN | 1 | ASCII |
| Special Personal Requirements | 12 | AN | 12 | M |
| Language Preference (ISO 639) | 2 | C | 2 | ASCII |

In the above table, and the tables to follow, both internal and external data formats are listed. As the conservation of EEPROM space is of paramount importance, the "internal" format of data (i.e., within EEPROM 212) may be different from the "external" format of the data (i.e., as read by the card reader at an access point 15). Thus, for example, a date field might consist of a four-byte BCD record within the card, but upon reading and processing by the terminal, this data might be converted to an eight-byte decimal value for more convenient processing.

Home EF 506 preferably includes data related to one or more of the cardholder's home addresses. In a particularly preferred embodiment, home EF 506 comprising the fields set forth in Table 6 below. The personal travel charge account pointer is preferably used to designate a preferred payment card, and consists of a number corresponding to one of the payment card records within payment card EF 510 (detailed below).

TABLE 6

Exemplary home EF file structure

| Record description | External format Size | External format Type | Internal format(bytes) Size | Internal format(bytes) Type |
|---|---|---|---|---|
| Home Address 1 | 40 | AN | 40 | ASCII |
| Home Address 2 | 40 | AN | 40 | ASCII |
| Home Address City | 25 | AN | 25 | ASCII |
| Home Address State | 5 | AN | 5 | ASCII |
| Home Country (ISO 3166) | 2 | AN | 2 | ASCII |
| Home Address Zip Code | 10 | AN | 10 | ASCII |
| Home Address Telephone | 20 | N | 10 | BCD |
| Home Address FAX | 20 | N | 10 | BCD |
| Home E-mail address | 40 | AN | 40 | ASCII |
| Personal travel charge account number pointer | 2 | N | 1 | BCD |

Business EF 508 preferably includes various data related to the cardholder's business (i.e., addresses, phone numbers, and the like). In a particularly preferred embodiment, business EF 508 comprises the fields set forth in Table 7 below. In this regard, the credit card pointer field is preferably used to point to a payment card record within payment card EF 510 (detailed below). The cost center, dept., division, and employee ID fields are employer-specific, and may or may not apply in a given case.

TABLE 7

Exemplary business EF file structure

| Record description | External format Size | External format Type | Internal format(bytes) Size | Internal format(bytes) Type |
|---|---|---|---|---|
| Business Address 1 | 40 | AN | 40 | ACSII |
| Business Address 2 | 40 | AN | 40 | ASCII |
| Business Address City | 25 | AN | 25 | ASCII |
| Business Address State | 5 | AN | 5 | ASCII |
| Business Country (ISO 3166) | 2 | AN | 2 | ASCII |
| Business Address Zip Code | 10 | AN | 10 | ASCII |
| Business Telephone No. | 20 | N | 10 | BCD |
| Business Address Fax | 20 | N | 10 | BCD |
| Business E-mail Address | 40 | AN | 40 | ASCII |
| Professional Title | 10 | AN | 10 | ASCII |
| Employee ID | 10 | AN | 10 | ASCII |
| Division | 20 | AN | 20 | ASCII |
| Dept | 20 | AN | 20 | ASCII |
| Cost Center | 12 | AN | 12 | ASCII |
| Professional travel account number pointer | 2 | N | 2 | BCD |
| Professional license data | 20 | AN | 20 | ASCII |
| Credit Card pointer | 2 | N | 1 | BCD |
| Company Name | 20 | AN | 20 | ASCII |

Preferences EF 514 preferably comprises data related to the cardholder's default personal preferences. In a particularly preferred embodiment, preferences EF 514 include a field comprising an array of preferences as set forth in Table 8 below.

TABLE 8

Exemplary preferences EF file structure

| Record description | External format Size | External format Type | Internal format(bytes) Size | Internal format(bytes) Type |
|---|---|---|---|---|
| Preferences Array | 20 | C | 20 | C |

Passport EF 516 is preferably used to store cardholder passport information. In a particularly preferred embodiment, passport EF 516 comprises the fields set forth in Table 9 below.

TABLE 9

Exemplary passport EF file structure

| Record description | External format Size | External format Type | Internal format(bytes) Size | Internal format(bytes) Type |
|---|---|---|---|---|
| Passport Number | 20 | AN | 20 | ASCII |
| Passport Country - ISO 3166 | 2 | AN | 2 | ASCII |
| Issuance Date | 8 | D | 4 | BCD |
| City of Issuance | 20 | AN | 20 | AN |
| Expiration Date | 8 | D | 4 | BCD |

Driver EF 516 preferably comprises cardholder driver license data. In a particularly preferred embodiment, driver EF 518 comprises the fields set forth in Table 10 below.

TABLE 10

Exemplary driver EF file structure

| Record description | External format Size | External format Type | Internal format(bytes) Size | Internal format(bytes) Type |
|---|---|---|---|---|
| Driver's License No. | 20 | a | 20 | ASCII |
| Driver's License Issuing State/Country | 2 | a | 2 | BCD |
| License Expiration Date | 8 | D | 4 | ASCII |
| License Type | 2 | C | 4 | BCD |

Biometric EF 522 is used to store biometric data (preferably encoded) such as fingerprint data, retina scan data, or any other sufficiently unique indicia the cardholder's physical or behavioral characteristics. In a particularly preferred embodiment, biometric EF 522 comprises a single data string as set forth in Table 11 below.

TABLE 11

Exemplary biometric EF file structure

| Record description | External format Size | External format Type | Internal format(bytes) Size | Internal format(bytes) Type |
|---|---|---|---|---|
| Biometrics template | 100 | AN | 100 | BIN |

Authentication EF 520 preferably comprises information for static authentication of the cardholder ID 406 application. This data is unique for each card, and is sufficiently complex such that counterfeit values cannot feasibly be created. This prevents creation of "new" counterfeit cards (i.e., cards with new authentication data), but does not prevent creation of multiple copies of the current card.

In a particularly preferred embodiment, authentication EF 520 includes public key certificate fields as shown in Table 12 below, wherein the external format is identical to the internal format. Preferably, the issuer RSA key is 640 bits long, and the CA key is 768 bits long.

TABLE 12

Exemplary authentication EF

| Record description | Internal format(bytes) | |
|---|---|---|
| | Size | Type |
| Signed Static Application Data | 80 | B |
| Static Data Authentication Tag List | 16 | B |
| Issuer Public Key Certificate | 96 | B |
| Issuer Public Key Exponent | 1 | B |
| Issuer Public Key Remainder | 20 | B |

Turning now to files under miscellaneous DF 530, preferred programs EF 528 preferably comprise data related to the cardholder's preferences as to airline companies, hotels, and rental car agencies. Specifically, this EF, in a particularly preferred embodiment, may comprise a plurality of records (e.g., three) indicating preferred companies for each type of travel partner as shown in Table 13. The actual data values conform to an arbitrary convention; that is, each airline, hotel, and rental car agency is assigned an arbitrary three-byte code.

TABLE 13

Exemplary programs EF

| Record description | External format | | Internal format(bytes) | |
|---|---|---|---|---|
| | Size | Type | Size | Type |
| Preferred Airlines | 9 (3 × 3) | C | 9 | C |
| Preferred Hotels | 9 | C | 9 | C |
| Preferred Rental Cars | 9 | C | 9 | C |

Payment card EF 510 is preferably used to catalog information related to the cardholder's various payment cards (i.e., debit cards, charge cards, and the like). In a particularly preferred embodiment, payment card EF comprises card numbers and expiration dates for two cards as shown in Table 14. The "ISO" and "non-ISO" designations refer to ISO-7813, which specifies a particular payment card number format. Thus, in a preferred embodiment, either an ISO or non-ISO card number scheme may be used. Moreover, it will be appreciated that this data set is sufficient only for "card not present" transactions, for example, transactions taking place remotely where only the card number and expiration date are required to effect a transaction. Data stored within payment system application 408 (described below) must be used to effect a "card present" transaction.

TABLE 14

Exemplary payment card EF file structure

| Record description | External format | | Internal format(bytes) | |
|---|---|---|---|---|
| | Size | Type | Size | Type |
| First Payment Card # (ISO) | 19 | N | 10 | BCD |
| First Payment Card Expiration Date | 8 | D | 4 | BCD |
| Second Payment Card # (non-ISO) | 20 | AN | 20 | ASCII |
| Second Payment Card Expiration Date | 8 | D | 4 | BCD |

Sequence EF 512 preferably includes information used to provide synchronization of the host and smartcard databases. In a particularly preferred embodiment, sequence EF 512 comprises a plurality of records comprising the field set forth in Table 15 below. This number is analogous to a "version" number for the data stored in the application.

TABLE 15

Exemplary sequence EF file structure

| Record description | External format | | Internal format(bytes) | |
|---|---|---|---|---|
| | Size | Type | Size | Type |
| Sequence Number | 16 | AN | 16 | ASCII |

Card number EF 526 is used to record a unique number identifying the smartcard, and may also be used for key derivation (as described in further detail below). Preferably, card number EF 526 comprises an eight-byte string as set forth in Table 16 below.

TABLE 16

Exemplary card number EF

| Record description | External format | | Internal format(bytes) | |
|---|---|---|---|---|
| | Size | Type | Size | Type |
| Card Number | 8 | HEX | 8 | HEX |

Issuance EF 511 is used to record various details related to the manner in which the application (i.e., cardholder ID DF 406) was created. This file includes information related to the identity of the organization that created the application, as well as information related to the application itself. In a particularly preferred embodiment, issuance EF 511 comprises fields as set forth in Table 17 below.

TABLE 17

Exemplary issuance EF file structure

| Field | External format | | Internal format (bytes) | |
|---|---|---|---|---|
| | Size | Type | Size | Type |
| Country Authority | | ISO 3166 | 2 | |
| Issuer Authority | 10 | RID - ISO 7816-5 | 5 | HEX |
| Application version | 5 | XX.YY | 2 | BCD |
| Application expiration date | 8 | YYYYMM DD | 4 | BCD |

TABLE 17-continued

Exemplary issuance EF file structure

| Field | External format | | Internal format (bytes) | |
|---|---|---|---|---|
| | Size | Type | Size | Type |
| Application effective date | 8 | YYYYMM DD | 4 | BCD |
| Personalizer Code | 1 | AN | 1 | ASCII |
| Personalization Location | 1 | AN | 1 | ASCII |

The personalizer code field shown in Table 17 refers to the organization that actually "personalizes" the file. That is, before a smartcard may be issued to the cardholder, the database structure must be created within EEPROM 212 (FIG. 2), and the initial data values (i.e., default preferences, cardholder name, pin numbers, etc.) must be placed in the appropriate fields within the various EFs. It will be appreciated that, given the nature of the present invention, the smartcard "issuer" and "personalizer" for any given application may not be the same. Therefore, it is advantageous to record various details of the personalization process within smartcard 100 itself. Similar issuance file structures may be provided for the other major applications.

Figure 5:
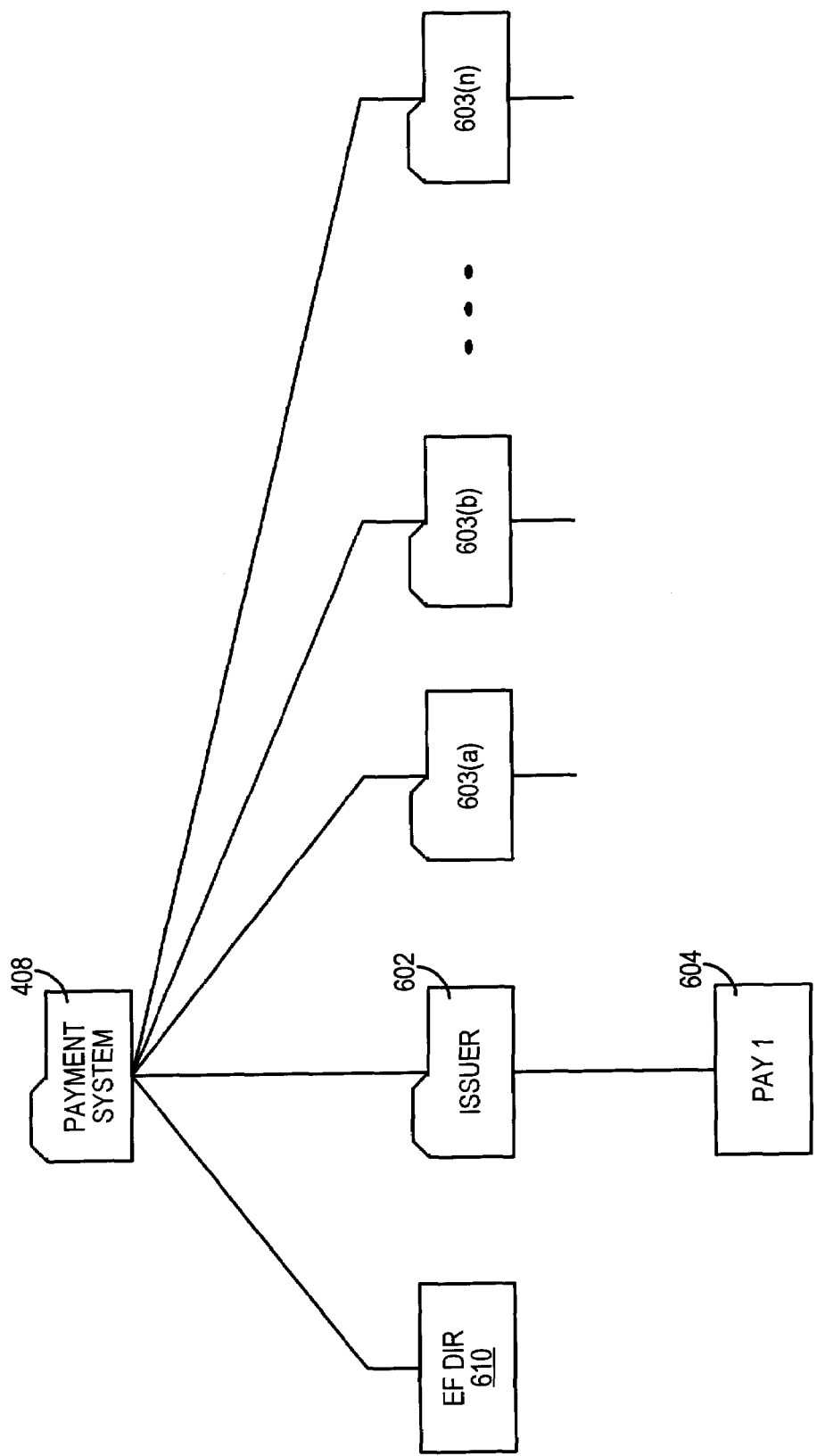
FIG. 5 sets forth an exemplary payment system application data structure in accordance with the present invention.

Referring now to FIG. 5, payment system application 408 preferably comprises a directory EF 610, issuer DF 602, and a number of optional DFs 603(a)-(n) for use by partnering financial organizations.

Directory EF 610 preferably includes a list of application identifiers and labels as described above in the context of cardholder ID application 406.

Issuer DF 602 comprises pay1 DF 604, which includes data that would traditionally be stored within tracks on a magnetic stripe card (i.e., debit cards, charge cards, and the like). In a preferred exemplary embodiment, pay1 DF 604 comprises a plurality of records having commonly known magnetic-stripe fields as specified in Table 18 below.

TABLE 18

Exemplary Pay1 EF file structure

| Record description | External format | | Internal format(bytes) | |
|---|---|---|---|---|
| | Size | Type | Size | Type |
| Format Code (Track 1) | 1 | AN | 1 | ASCII |
| PAN (Track 2) | 15 | N | 8 | BCDF right padding |
| Expiration date (Track 1 or 2) | 4 | YYMM | 2 | BCD |
| Effective date (Track 1 or 2) | 4 | YYMM | 2 | BCD |
| Discretionary data (Track 1 or 2) | 5 | N | 3 | BCDF right padding |
| Name (Track 1) | 26 | AN | 26 | ASCII, LJ blank padding |

Transaction rules application 410 and risk management application 412 may be of similar directory structure (not shown) as is discussed with respect to the cardholder identification application 406, and payment system application 408 discussed above. For example, transaction rules application 410 and risk management directory 412 may contain directories including data relevant to processing restrictions (e.g., application version number, application usage control, effective date check, expiration date check, offline transaction authorization data, issuer authentication data, etc.).

In the context of smartcard transactions, application 410, 412 may additionally contain directories relevant to data security. Exemplary security directories may include data relevant to: 1) data confidentiality, 2) data integrity, 3) access control, 4) authentication, and 5) non-repudiation. Each of these dimensions is addressed through a variety of security mechanisms. Data confidentiality, which deals with keeping information secret (i.e., unreadable to those without access to a key), is substantially ensured using encryption technology. Data integrity (and data source verification) focuses on ensuring that data remains unchanged during transfer, and typically employs message authentication techniques. Access control involves cardholder verification and other requirements necessary in order for a party to read or update a particular file. Authentication involves ensuring that the card and/or the external device is what it purports to be, and non-repudiation deals with the related task of ensuring that the source of the data or message is authentic (i.e., that a consumer may not repudiate a transaction by claiming that it was "signed" by an unauthorized party).

Authentication may be preferably performed using a "challenge/response" algorithm. In general, authentication through a challenge/response system involves: 1) generation of a random number by a first party, 2) transmission of the random number to a second party (the "challenge"), 3) encryption of the random number by the second party in accordance with a key known to both parties, 4) transmission of the encrypted random number to the first party (the "response"), 5) encryption of the random number by the first party, and 6) comparison by the first party of the two resulting numbers. In the case where the two numbers match, authentication is successful; if not, the authentication is unsuccessful. Note that authentication can work both ways: the external world might request authentication of a smartcard (internal authentication), and a smartcard might request authentication of the external world (external authentication). A more detailed account of a preferred challenge/response algorithm can be found in the IBM MFC specification.

In a preferred embodiment, the DES algorithm (Data Encryption Standard) is employed for the various security functions; however, it will be appreciated that any number of other symmetrical or asymmetrical techniques may be used in the context of the present invention. More particularly, there are two general categories of encryption algorithms: symmetric and asymmetric. Symmetric algorithms use the same key for encryption and decryption, for example, DEA (data encryption algorithm) that uses a 56-bit key to encrypt 64-bit blocks of data. Asymmetric algorithms, in contrast, use two different keys: one secret key and one public key. The RSA algorithm, for example, uses two such keys and exploits the computational complexity of factoring very large prime numbers. Additional information regarding these and other cryptographic principles can be found in a number of standard texts, for example: Seberry & Pieprzyk, "Cryptography: An Introduction to Computer Security" (1989); Rhee, "Cryptography and Secure Communications" (1994); Stinson, "Cryptography: Theory and Practice" (1995); "Contemporary Cryptography: The Science of Information Integrity" (1992); and Schneier, "Applied Cryptography" (2d ed. 1996), the contents of which are hereby incorporated by reference.

Including access conditions within the header of each EF and DF suitably provides access control. This prevents a particular operation (e.g., reading or updating) from being performed on a file unless the required access conditions have been fulfilled. Many different access conditions are appropriate in a smartcard context. For example, the smartcard might require cardholder verification (i.e., request that the cardholder enter a PIN) before a file operation is allowed. Similarly, internal and/or external authentication as described above might be required.

Figure 6:
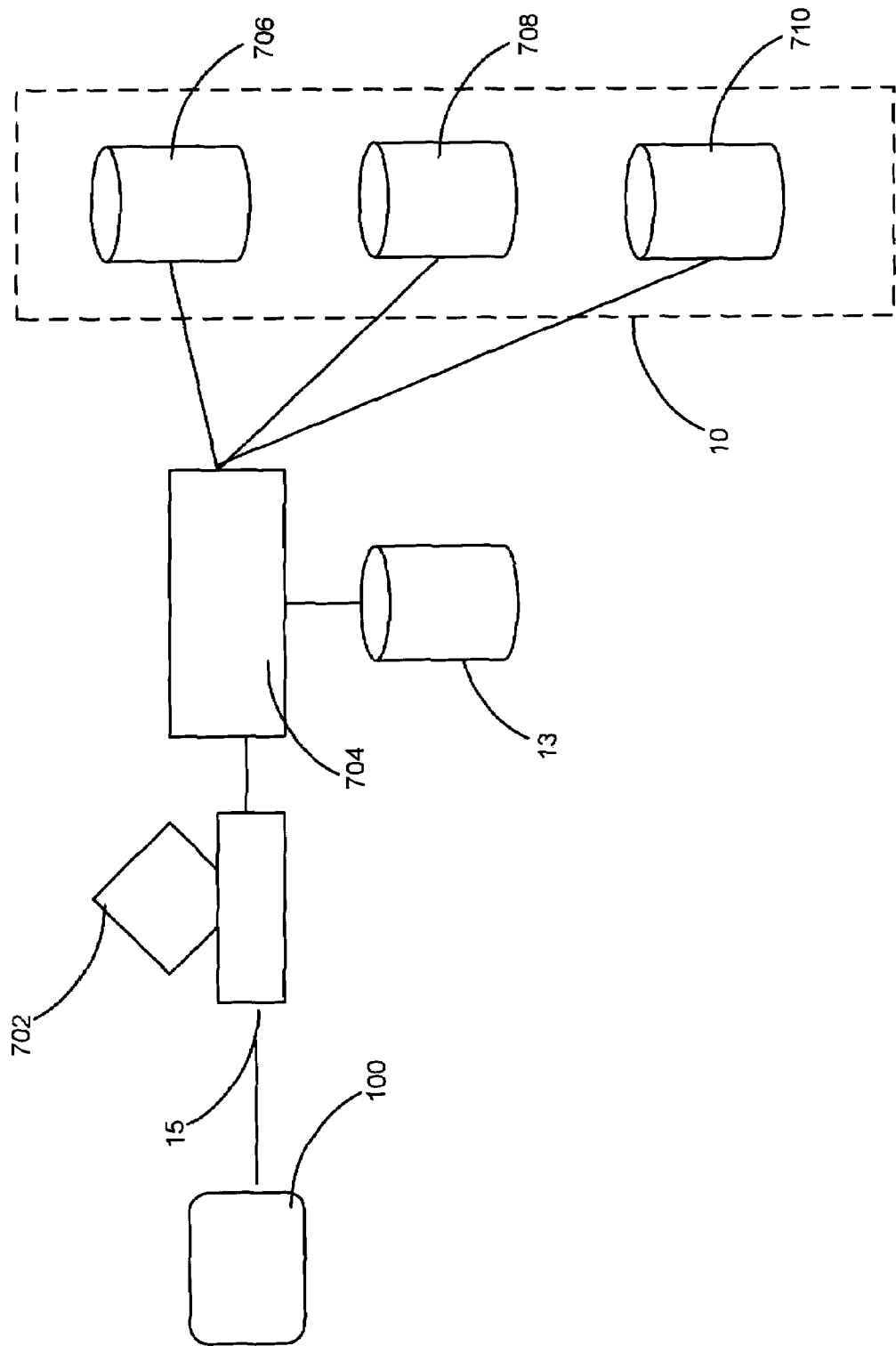
FIG. 6 sets forth a block diagram of a preferred transaction completion system data structure in accordance with the present invention.
Figure 7:
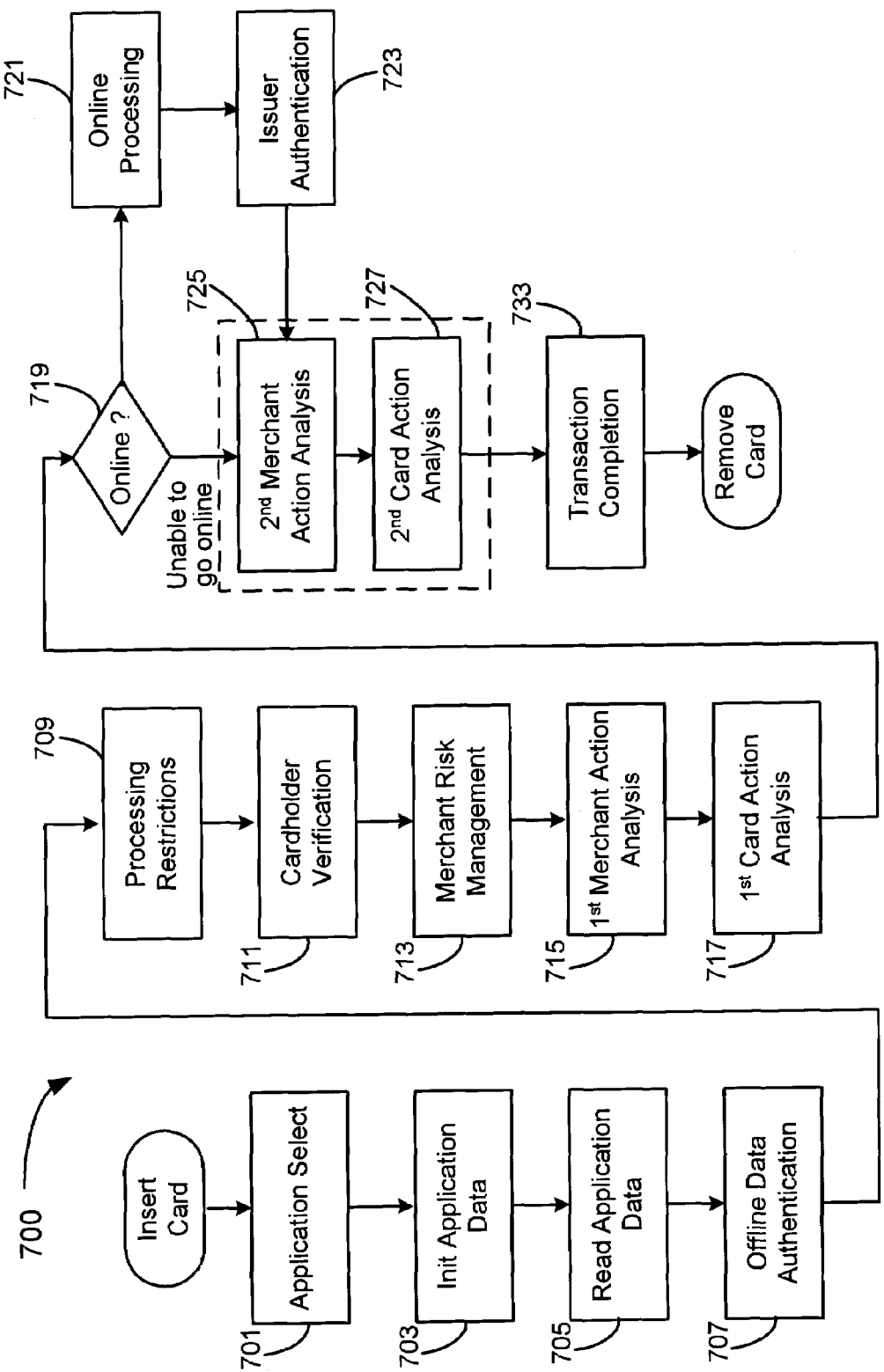
FIG. 7 sets forth a flow chart diagramming a transaction method in accordance with the present invention.

FIG. 7 depicts a flow diagram of an exemplary transaction completion method according to the present invention. An understanding of the method of FIG. 7 may be had with reference to FIGS. 6, 7 and 8. As shown, the method 700 begins with a cardholder presenting the smartcard 100 to initiate transaction completion (step 701). Card 100 is inserted in a card reader 702 provided at an access point 15 and suitable connections are made between communication region 104 on card 100 and the card reader. In a preferred embodiment, physical contacts (contacts 106 in FIG. 1) are used, and DATA, CLOCK, RESET, VDD, and GND connections are made. These contacts are electrically activated in a particular sequence, preferably in accordance with ISO 7816-3 (RST to low state, VDD powered, DATA to reception mode, then CLK applied).

In an alternate embodiment of the transaction device (e.g., smartcard 100), such as the RF transaction device discussed with reference to FIG. 9, the communication between the transaction device and the reader may take place in a contactless environment. For example, data may be transmitted between the transaction device and the merchant reader using a RF medium. For a complete description of the method of transferring information between a RF transaction device and a RF reader please refer to U.S. patent application Ser. No. 10/192,488, filed Jul. 9, 2002, entitled "SYSTEM AND METHOD FOR PAYMENT USING RADIO FREQUENCY IDENTIFICATION IN CONTACT AND CONTACTLESS TRANSACTIONS," incorporated herein by reference.

Although the present invention is described with reference to a smartcard 100, the invention may be practiced using a RFID transaction device, such as fob 102 of FIG. 9. In this case, fob 902 may be placed in communication with a RFID reader 1002 shown in FIG. 10. A detailed description of the transfer of data using fob 902, in accordance with the invention, is described below with respect to FIG. 10.

Returning now to the exemplary smartcard processing description discussed above, once the card 100 is presented to the reader 702, the merchant system 704 receives data from the card 100 relative to the applications contained in, for example, the payment system director 408. The card 100 may be configured to direct the merchant system 704 to which card 100 directory or data location from which to retrieve the applications contained thereon. The merchant system 704 receives the application information and compares the information with payment applications data stored on the merchant system 704 (e.g., in merchant database 13) to determines which processing applications are supported by both the card 100 and the merchant system 704 (step 703). The merchant system 704 selects the application with the highest priority, as determined by the hierarchical ordering of the payment applications contained on the card 100 and in the merchant system 704. If no applications are supported, then the transaction may be terminated. For additional information on selecting an application and the response provided by merchant system 704 and card 100, see the ISO 7816-4 specification, incorporated herein by reference.

Once the appropriate application is selected (step 703), the merchant system 704 then provides the card 100 with a "READ APPLICATION DATA" command (step 705), to retrieve the data objects pertinent to user or issuer authentication (e.g., certification authority public key index, issuer public key certificate, issuer public key exponent, signed static application data, and issuer public key remainder data), and transaction completion (e.g., account or card expiration date, cardholder name, address, issuer identification code, acquirer identification code, etc.). In one exemplary embodiment, the merchant system 704 may store the data received from card 100 in a merchant database 13 for later use.

The READ APPLICATION DATA command may contain a "GET PROCESSING OPTIONS" command, which prompts the card 100 to present to the reader 702, the appropriate directory or data location to be used during the initiated transaction. In response to the GET PROCESSING OPTIONS command, the card 100 directs the merchant system 704 to the list of supported applications and related data files to be received from the card 100 in step 701 to determine which processing method to perform (e.g., online or offline) for transaction authentication.

In one exemplary embodiment, the merchant system 704 may provide the card 100 with a "GENERATE AUTHENTICATION CRYPTOGRAM" command ("GENERATE AC" command) discussed below. The GENERATE AC command may not be issued until the transaction has been initiated.

For offline data authentication (step 707), the merchant system 704 may provide the card 100 a GENERATE AC command, which prompts the merchant system 704 to authenticate the card 100 offline using either static or dynamic data authentication. In general, offline data authentication may be attempted with every transaction. Dynamic data authentication (DDA) data objects stored on the card 100 ordinarily have the highest priority, and if both the merchant system 704 and the card support DDA, then DDA is performed. If the card 100 and the merchant system 704 do not support DDA, but support static data authentication (SDA), then SDA is performed.

In general, the data relationships used for offline authentication may include a single issuer (or multiple) account issuer EMV Certificate Authority (CA). Where the account is maintained by an issuer, but the card is provided to the user by a third-party merchant (e.g., United Airlines American Express Card, Private Label VISA card, Bank of America MasterCard, etc.), the third-party merchant (sometimes referred to as an "issuing partner") may also have a CA stored on each card 100 which is provided by the issuing partner. Each card 100 may also include an issuing partner Public Key certificate, which may be signed by the issuer EMV CA public key. Additionally, each payment application stored on the card 100 may hold an application DDA Private Key and Public Key Certificate which is signed by the issuer CA Private Key. Thus, for the cryptographic scheme to work, each merchant system 704 need only have access to the issuer CA Public Key scheme, which may be provided to the merchant system 704 by the issuer 10 prior to transaction initiation (step 701).

During SDA, the card 100 may be in a passive state and the merchant system 704 may be in an active state. That is, the card 100 provides the data to be validated but the merchant system 704 carries out all computations. For example, during SDA fixed signature over data elements held within the card 100 are validated to ensure that the data has not been fraudulently altered since card 100 personalization. The merchant system 704 may use the issuer public key retrieved from the card to decrypt data from the card 100 to obtain a hash. In this way, the merchant system 704 can determine if the hash, obtained through decryption, matches or corresponds to the hash of the actual data objects retrieved from the card 100. If the hashes do not match, then offline SDA fails.

Alternatively, if the card 100 and the merchant system 704 both support DDA, DDA is performed. DDA is an offline authentication technique in which the card 100 and the merchant system 704 are both active and capable of executing an asymmetric cryptographic algorithm. DDA validates that the card 100 data has not been altered and that the card 100 is genuine. As a part of DDA, the merchant system 704 may validate the card 100 static data as discussed with respect to SDA. In addition, the merchant system 704 requests that the card 100 generate a cryptogram using dynamic data, which is unique to the transaction, and which is retrieved from the card 100 and the merchant 704, and a card DDA Authentication Private Key. The merchant system 704 may decrypt the dynamic signature using the card 100 application DDA Public key recovered from the card data. The merchant system 704 may then compare the decrypted dynamic signature (e.g., hash) to the hash of the original data on the card 100 to see if a match exists. If so, then the merchant system 704 may be assured that the card 100 presented for transaction completion is not counterfeit.

The results of the offline data authentication process are used to determine if the transaction should be approved offline, online, or if the transaction request should be denied, as is discussed more fully below.

Should the merchant system 704 determine that the offline authentication can be made and is successful, then the merchant system 704 may examine the data received from the card 100 to see if process restrictions may affect completion of the transaction (step 709). The merchant system 704 may examine, for example, whether the card 100 is expired or if the effective date on the card has been exceeded. The merchant system 704 may also examine whether the application versions contained on the card 100 and the merchant system 704 are compatible, and whether any Application Usage Control Restrictions are in effect. An issuer 10 or cardholder may define various Application Usage Control Restrictions to place limits on for example, card 100 usage, or products or services to be purchased, etc.

If no processing restrictions exist which prevent transaction completion, the merchant system 704 may seek to verify the cardholder's identity (step 711). The merchant system 704 may use any technique for verifying the cardholder's identity as is found in the art. For example, the merchant system 704 may verify the user information received from the card 100 by, for example, placing the cryptographic information in an algorithm for comparison with known quantities. In another exemplary embodiment, the merchant system 704 may require the cardholder to supply additional secondary identifying indicia (e.g., biometric data or personal security code, or personal identification number), which may be compared against data received from the card 100.

Once the cardholder's identity is verified (step 711), the merchant system 704 may perform a risk management process (step 713) to determine if certain risk factors exist, which prevent transaction completion. For example, the merchant system 704 may check whether the transaction is over the merchant floor limit, the account number is on an optional merchant exception file, the limit for consecutive offline transactions has been exceeded, the card 100 is a newly-issued card, or the merchant system 704 has forced the transaction online.

Occasionally, a merchant system 704 may randomly select a transaction for online processing. The merchant system 704 may compile the results of the online processing and store the compiled results in merchant database 13 for later reference.

As a part of the merchant risk management process (step 713), the merchant system 704 receives data corresponding to the number of times an application transaction has been used (Application Transaction Counter Data). The merchant system 704 stores the Application Transaction Counter Data (ATCD) in merchant database 13 for later use. For example, the merchant system 704 uses the ATCD to guard the transaction against fraud.

The merchant system 704 may then perform a $1^{st}$ merchant action analysis to determine if the transaction should be approved offline, sent online for approval, or declined offline (step 715). The merchant system 704 uses the results of the offline data authentication, processing restrictions, merchant risk management data, and rules set in the card 100 and the merchant system 704 in its determination. After determining the disposition of the transaction, the merchant system 704 requests an application cryptogram from the card 100. The type of cryptogram application requested by the merchant system 704 depends on the disposition of the transaction. If the merchant system 704 determines that the transaction should be approved offline, the merchant system 704 may request a Transaction Certificate (TC) application for use in securing transaction approval. If, the merchant system 704 determines that the transaction should proceed online for approval, then the merchant system 704 may request an Authorization Request Cryptogram (ARQC) for a request for approval online. Lastly, if the merchant system 704 determines that the transaction should be declined, the merchant system may request a Application Authentication Cryptogram (AAC) for declining the transaction.

Online authorization of the transaction may only occur if the merchant system 704 has online capabilities (i.e., establish a direct link with issuer for authorization) (step 719). If the merchant system 704 has online capabilities, the merchant system 704 manipulates and analyzes the offline processing results to determine whether to go on line for online authorization. The results of the analysis may prompt the merchant system 704, to not select "offline decline" or "go online", but instead to select "approve offline", in which case, the merchant system 704 may request a TC from the card 100 and request that the card 100 permit offline approval.

On the other hand, if the merchant system 704 does not have online capabilities, then the merchant system 704 may retrieve offline processing results from both the merchant system 704 and the card 100 for comparison. The merchant system 704 may compare the results to determine whether to request the card 100 to decline or approve the transaction.

Upon receiving the $1^{st}$ application cryptogram request from the merchant system 704 (step 701), the card 100 may perform a $1^{st}$ Card Action Analysis (step 717). As a sub process thereof, the card 100 may perform a $1^{st}$ Card Risk Management process to determine the response to be given to the merchant system 704 request for cryptogram. After completion of the 1 Card Action Analysis (step 717) the card may generate an appropriate Application Cryptogram using application data and a secret DES Key (the AC DEA keys) stored on the card 100, and may return the Application Cryptogram to the merchant system 704.

As noted, the card 100 may return a cryptogram to the merchant system 704 in response to the merchant system's 704 request for a 1 application cryptogram. That is, the card 100 may determine if the transaction should be approved offline, sent to online approval, or should be declined offline. For offline-approved transactions, the card 100 may provide the merchant system with a TC. The card 100 may transmit the TC and the data used to generate it to the merchant system 704. The information transmitted to the merchant system 704 may be used at a later date as evidence that a transaction took place, settle cardholder disputes, or for chargebacks, and the like. The TC may be used by the issuer system 10 to prove that the transaction has not been altered by the merchant attendant to the transaction or the acquirer.

If the card 100 determines that a transaction should be approved offline, the merchant system does not request a $2^{nd}$ Merchant Action Analysis from the card 100 (step 725). Instead, the merchant system 704 may move the transaction toward transaction completion (step 733), where the transaction is completed under business as usual standards.

If the card 100 determines that the transaction should be declined offline, the card 100 may generate a AAC and return the AAC to the merchant system 704. The card 100 may transmit the AAC and the data used to generate it to the merchant system 704, where the data may be used for future cardholder disputes, chargeback purposes, and the like.

Where the card 100 determines that the transaction should be completed or authorized online, the card 100 may generate a ARQC cryptogram and may forward the ARQC to the merchant system 704. In this case, the merchant system 704 may move directly to online processing (step 721). If the merchant system 704 is unable to go online (step 725), the merchant system 704 may perform a $2^{nd}$ Card Action Analysis (step 727).

As noted, the merchant system 704 performs a $1^{st}$ Merchant Action Analysis to determine if the transaction should be subjected to online authorization. Similarly, card 100 performs a $1^{st}$ card action analysis to determine if the transaction should be subjected to online authorization. If either the card 100 or the merchant system 704 determines that the transaction requires online authorization, the merchant system 704 transmits the online authorization message to the issuer 10 if the merchant has online capability (step 721). The message includes the cryptogram (e.g., ARQC) generated by the card 100, the data used to generate the cryptogram and the indicators showing offline processing results. In markets that support the ISO 8583 field 55 or equivalent standard, the cryptogram and associated data are compressed into the space available with Track 1 and/or Track 2 data format.

During online processing, the issuer 10 validates the cryptogram to authenticate the card 100 (step 723). The issuer system 10 may then provide an authorization response to the merchant system 704. The authorization response may include an issuer-generated Authorization Response Cryptogram (ARPC) (derived from the cryptogram generated by the card 100, the authorization response code, card 100 secret DES key (AC DEA Keys)). If the authorization response message transmitted back to the merchant system 704 contains a response cryptogram (ARPC), the card 100 performs issuer authentication by validating that the cryptogram came from a genuine issuer (or its agent). This prevents villainous third parties from circumventing the card 100 security features by simulating online processing and fraudulently approving a transaction to reset counters and indicators.

The merchant system 704 may receive the issuer authentication data, and if the authentication was successful (i.e., the merchant system 704 received a response cryptogram from the issuer system 10), the merchant system 704 may request a 2nd application cryptogram from the card 100 using the response cryptogram from the issuer system 10 (step 727).

In some cases, however, especially in a contactless transaction, the cardholder may have removed the card 100 from the field of the reader 702 before transaction completion. If so, the merchant system 704 may alternatively conclude the transaction based on the response it received from the issuer system 10 without any further interaction from the card 100.

If the merchant system receives no response from the issuer system 10, then the issuer is not authenticated (e.g., the merchant system 704 does not receive a response cryptogram from the issuer system 10), the merchant system 704 may use the response it receives from online processing (if any is received) to decide the outcome of the transaction, in which case, the merchant system 704 may conclude the transaction without any additional interaction with the card 100.

If the merchant system 704 is unable to go online or the merchant receives a response cryptogram (e.g., issuer 10 authenticated) from the issuer system 10, the merchant system 704 may decide whether to request offline approval or offline decline from card 100. The nature of the request by the merchant system 704 may be dependent upon Merchant Action Codes stored on the merchant system 704 and the Issuer Action Codes stored on the card 100. The Action Codes are guidelines or rules established by the merchant system 704 or issuer 10 which detail the conditions under which a transaction should be approved offline based on the information received during the prior processing steps.

If the cardholder has not removed card 100 from the field of the reader 702 during processing, the merchant system 704 may provide the card 100 with a $2^{nd}$ generate AC command, wherein the card 100 may generate a $2^{nd}$ Application Cryptogram, and the card 100 may set or reset security related parameters. The card 100 may decline an issuer approved transaction based upon the issuer authentication results (step 723) and the Issuer Action Codes stored on the card 100. Alternatively, the card 100 may generate a TC for approved transactions, and an AAC for declined transactions.

The merchant system 704 may then be forwarded for transaction completion (step 733) under business a usual standard.

At the end of a smartcard session, contacts 106 are deactivated. Deactivation of contacts 106 is preferably performed in the order specified in ISO 7816-3 (i.e., RST to low state, CLK to low state, DATA to low state, VDD to inactive state). As mentioned above, the VPP contact is not utilized in a preferred embodiment.

Alternatively, as described in FIG. 6, where the card 100 was placed in contactless communication with the merchant system 704 (e.g., reader 702), the card 100 will be deactivated once it is removed from the interrogation field of the reader 702.

In the context of the present invention, the merchant system 704 ordinarily performs transaction completion (step 733). If the merchant system 704 transmits a clearing message subsequent to an authorization message, the TC (or ARQC in the case of an online issuer not authenticated transaction) is transmitted in the clearing message as well. Or, the merchant system 704 may decline to complete the transaction where the aforementioned analysis of the Action Codes requires it.

Once the transaction is complete, the merchant system 704 may forward record of the transaction to the appropriate issuer system 10 or acquirer (not shown) for settlement under the merchant system 704 business as usual practice.

It should be noted that the method 700 may be used in both EMV and non-EMV markets. In both the EMV and non-EMV markets the architecture of the system does not significantly change between the merchant system 704, to the settlement database 706, to the authorization database 708, or to the issuer database 710. In EMV markets, standard EMV messages and responses may be used with contactless cards behaving as EMV compliant tokens although not using the full functionality defined in EMV. In non-EMV markets, standard ISO 8583 messages used in magnetic stripe transaction will be used to transmit information relating to the contactless transactions that shall be packed into the magnetic stripe data.

Referencing FIGS. 9-12, in general, the operation of the present invention using a RFID device (e.g., fob 902) may begin when fob 902 is presented for payment, and is interrogated by RFID reader 1004. Fob 902 and RFID reader 1004 may then engage in mutual authentication as described with respect to smartcard 100 and merchant system 704, after which the transponder 102 may provide the transponder identification and/or account identifier to the RFID reader 1004, which may further provide the information to, for example, a merchant system 704 POS device not shown.

The RFID reader 1004 may be configured to communicate using a RFID internal antenna 906. Alternatively, RFID reader 1004 may include an external antenna 1008 for communication with fob 902, where the external antenna may be made remote to the RFID reader 1004 using a suitable cable and/or data link. RFID reader 1004 may be further in communication with a merchant system POS via a data link (not shown).

Although the point-of-interaction device is described herein with respect to a merchant point-of-sale (POS) device, the invention is not to be so limited. Indeed, a merchant POS device is used herein by way of example, and the point-of-interaction device may be any device capable of receiving fob account data. In this regard, the POS may be any point-of-interaction device enabling the user to complete a transaction using a fob 902. The POS device may receive the fob 902 information and provide the information to host system for processing.

A variety of conventional communications media and protocols may be used for data links. For example, the data links referenced herein may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the merchant system 704, including the POS device and host network, may reside on a local area network which interfaces to a remote network (not shown) for remote authorization of an intended transaction. The merchant system 704 may communicate with the remote network via a leased line, such as a T1, D3 line, or the like. Such communications lines are described in a variety of texts, such as, "Understanding Data Communications," by Gilbert Held, which is incorporated herein by reference.

Figure 10:
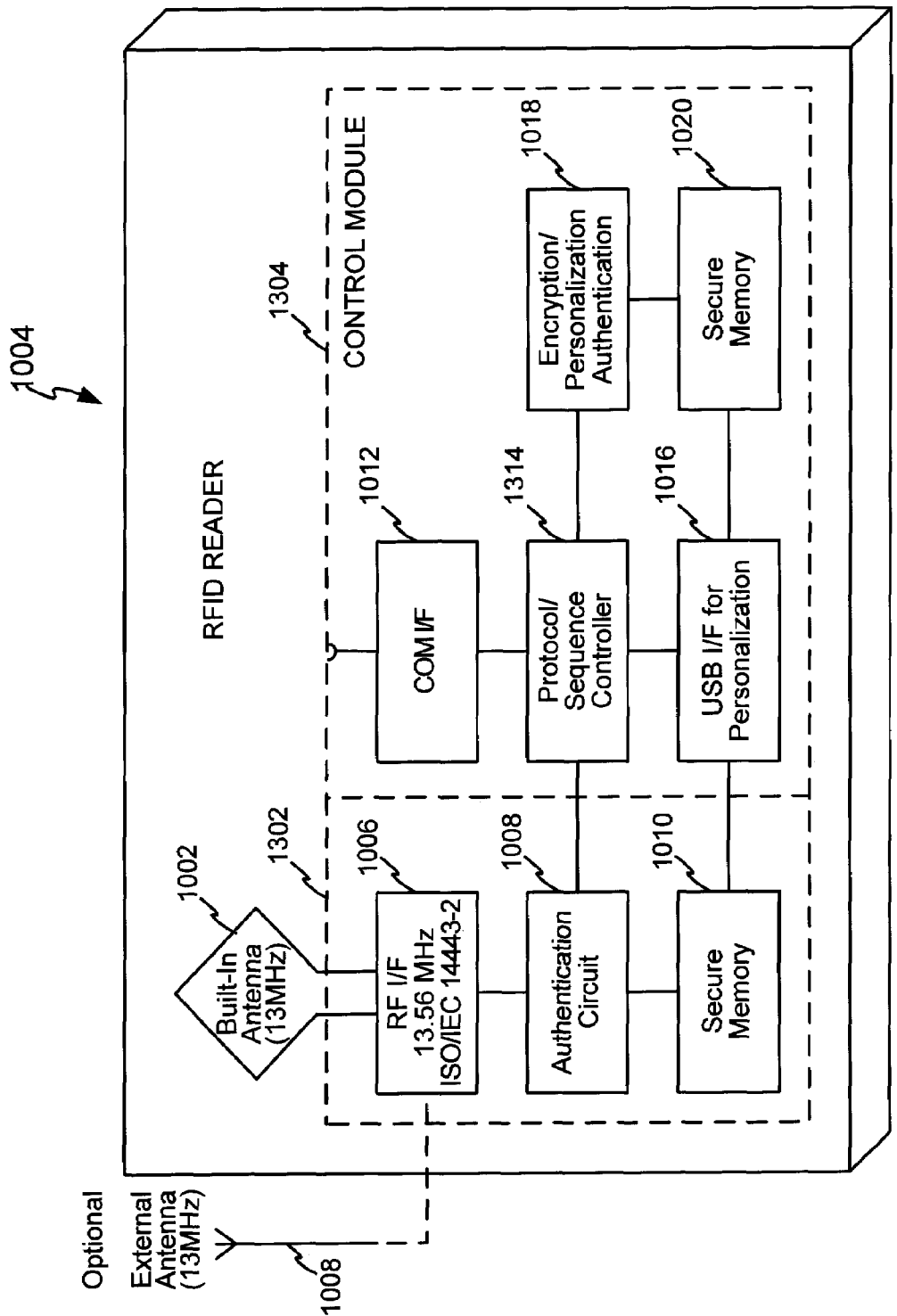
FIG. 10 is a block diagram of an exemplary RF/RFID reader useful in practicing the present invention.

FIG. 10 illustrates an exemplary block diagram of a RFID reader 1004 in accordance with an exemplary embodiment of the present invention. RFID reader 1004 includes, for example, an antenna 1002 coupled to a RF module 1302, which is further coupled to a control module 1304. In addition, RFID reader 1004 may include an antenna 1008 positioned remotely from the RFID reader 1004 and coupled to RFID reader 1004 via a suitable cable or other wire or wireless connection.

RF module 1302 and antenna 1002 may be suitably configured to facilitate communication with fob 902. Where fob 902 is formatted to receive a signal at a particular RF frequency, RF module 1302 may be configured to provide an interrogation signal at that same frequency. For example, in one exemplary embodiment, fob 902 may be configured to respond to an interrogation signal of about 13.56 MHz. In this case, RFID antenna 1002 may be 13 MHz and may be configured to transmit an interrogation signal of about 13.56 MHz. That is, fob 902 may be configured to include a first and second RF module (e.g., transponder) where the first module may operate using a 134 kHz frequency and the second RF module may operate using a 13.56 MHz frequency. The RFID reader 1004 may include two receivers which may operate using the 134 kHz frequency, the 13.56 MHz frequency or both. When the reader 1004 is operating at 134 kHz frequency, only operation with the 134 kHz module on the fob 902 may be possible. When the reader 1004 is operating at the 13.56 MHz frequency, only operation with the 13.56 MHz module on the fob 902 may be possible. Where the reader 1004 supports both a 134 kHz frequency and a 13.56 MHz RF module, the fob 902 may receive both signals from the reader 1004. In this case, the fob 902 may be configured to prioritize selection of the one or the other frequency and reject the remaining frequency. Alternatively, the reader 1004 may receive signals at both frequencies from the fob upon interrogation. In this case, the reader 1004 may be configured to prioritize selection of one or the other frequency and reject the remaining frequency.

Further, protocol/sequence controller 1314 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform the fob 902 user that the transaction is initiated (e.g., fob is being interrogated), the fob is valid (e.g., fob is authenticated), transaction is being processed, (e.g., fob account number is being read by RFID reader) and/or the transaction is accepted or denied (e.g., transaction approved or disapproved). Such an optional feedback may or may not be accompanied by an audible indicator (or may present the audible indicator singly) for informing the fob 902 user of the transaction status. The audible feedback may be a simple tone, multiple tones, musical indicator, and/or voice indicator configured to signify when the fob 902 is being interrogated, the transaction status, or the like.

RFID antenna 1002 may be in communication with a transponder 1006 for transmitting an interrogation signal and receiving at least one of an authentication request signal and/or an account data from fob 902. Transponder 1006 may be of similar description as transponder 914 of FIG. 9. In particular, transponder 1006 may be configured to send and/or receive RF signals in a format compatible with antenna 1002 in similar manner as was described with respect to fob transponder 914. For example, where transponder 1006 is 13.56 MHz RF rated antenna 1002 may be 13.56 MHz compatible. Similarly, where transponder 1006 is ISO/IEC 14443 rated, antenna 1002 may be ISO/IEC 14443 compatible.

RF module 1302 may include, for example, transponder 1006 in communication with authentication circuitry 1008 which may be in communication with a secure database 1010. Authentication circuitry 1008 and database 1010 may be of similar description and operation as described with respect to authentication circuitry 910 and secure memory database 912 of FIG. 9. For example, database 1010 may store data corresponding to the fob 902 which are authorized to transact business over system 100. Database 1010 may additionally store RFID reader 1004 identifying information for providing to fob 902 for use in authenticating whether RFID reader 1004 is authorized to be provided the fob account number stored on fob database 914.

Authentication circuitry 1008 may be of similar description and operation as authentication circuitry 910. That is, authentication circuitry 1008 may be configured to authenticate the signal provided by fob 902 in similar manner as is discussed with reference to the merchant system 704 and smartcard 100. As is described more fully below, fob 902 and RFID reader 1004 may engage in mutual authentication. In this context, "mutual authentication" may mean that operation of the system 100 may not take place until fob 902 authenticates the signal from RFID reader 1004, and RFID reader 1004 authenticates the signal from fob 902.

Figure 11:
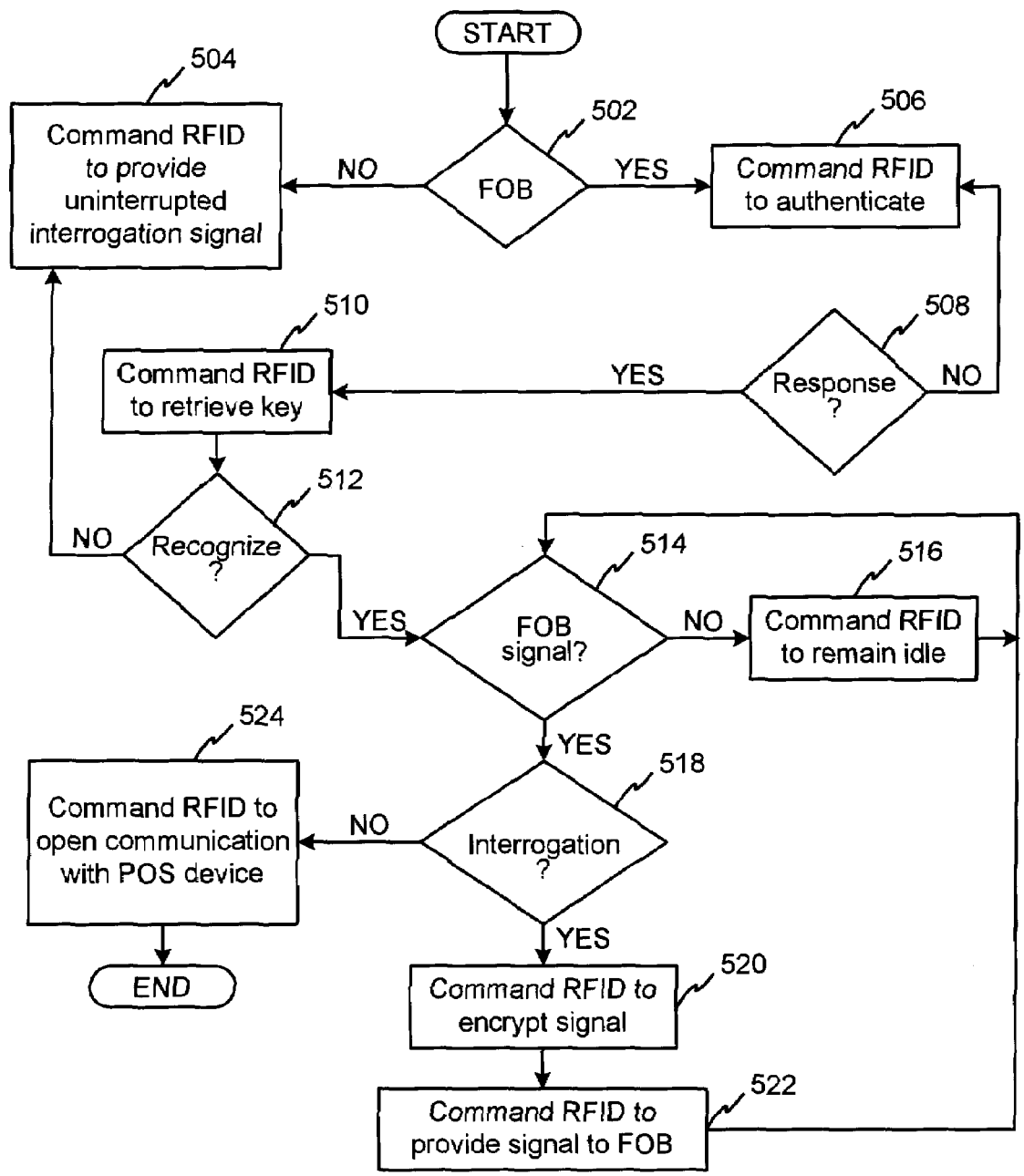
FIG. 11 is a flow chart of an exemplary protocol/sequence controller decision process useful with the present invention.

Authentication circuitry 1008 may additionally be in communication with a protocol/sequence controller 1314 of similar operation and description as protocol/sequence controller 908 of FIG. 9. That is, protocol/sequence device controller 1314 may be configured to determine the order of operation of the RFID reader 1004 components. For example, FIG. 11 illustrates an exemplary decision process under which protocol/sequence controller 1314 may operate. Protocol/sequence controller 1314 may command the different components of RFID reader 1004 based on whether a fob 902 is present (step 502). For example, if a fob 902 is not present, then protocol/sequence controller 1314 may command the RFID reader 1004 to provide an uninterrupted interrogation signal (step 504). That is, the protocol/sequence controller 1314 may command the authentication circuit 1008 to provide an uninterrupted interrogation signal until the presence of a fob 902 is realized. If a fob 902 is present, the protocol/sequence controller 1314 may command the RFID reader 1004 to authenticate the fob 902 (step 506).

As noted above, authentication may mean that the protocol/sequence controller 1314 may command the authentication circuit 1008 to provide fob 902 with an authorization code. If a response is received from fob 902, protocol/sequence controller may determine if the response is a response to the RFID reader 1004 provided authentication code, or if the response is a signal requiring authentication (step 508). If the signal requires authentication, then the protocol/sequence controller 1314 may activate the authentication circuit as described above (step 506). On the other hand, if the fob 902 signal is a response to the provided authentication code, then the protocol/sequence controller 1314 may command the RFID reader 1004 to retrieve the appropriate security key for enabling recognition of the signal (step 510). That is, the protocol/sequence controller 1314 may command the authentication circuit 1008 to retrieve from database 1010 a security key (e.g., transponder system decryption key), unlock the signal, and compare the signal to the signal provided by the RFID reader 1004 in the authentication process (e.g., step 506). If the signal is recognized, the protocol/sequence controller 1314 may determine that the fob 902 is authorized to access the transaction system (step 512). If the signal is not recognized, then the fob 902 is considered not authorized, in which case, the protocol/sequence controller 1314 may command the RFID controller to interrogate for authorized fobs (step 504).

Once the protocol/sequence controller 1314 determines that the fob 902 is authorized, the protocol/sequence controller 1314 may seek to determine if additional signals are being sent by fob 902 (step 514). If no additional signal is provided by fob 902, then the protocol/sequence controller 1314 may provide all the components of RFID reader 1004 to remain idle until such time as a signal is provided (step 516). Contrarily, where an additional fob 902 signal is provided, the protocol/sequence controller 1314 may determine if the fob 902 is requesting access to the merchant point-of-sale terminal (e.g., POS device) or if the fob 902 is attempting to interrogate the RFID reader 1004 for return (e.g., mutual) authorization (step 518). Where the fob 902 is requesting access to a merchant POS device, the protocol/sequence controller 1314 may command the RFID reader 1004 to open communications with the POS device (step 524).

On the other hand, if the protocol/sequence controller 1314 determines that the fob 902 signal is a mutual interrogation signal, then the protocol/sequence controller 1314 may command the RFID reader 1004 to encrypt the signal (step 520). The protocol/sequence controller 1314 may command the encryption authentication circuit 1018 to retrieve from database 1020 the appropriate encryption key in response to the fob 902 mutual interrogation signal. The protocol/sequence controller 1314 may then command the RFID reader 1004 to provide the encrypted mutual interrogation signal to the fob 902 (step 522). The protocol/sequence controller 1314 may command the authentication circuit 1018 to provide an encrypted mutual interrogation signal for the fob 902 to mutually authenticate. Fob 902 may then receive the encrypted mutual interrogation signal and retrieve from authentication circuitry 1018 a RFID reader 1004 decryption key.

Although an exemplary decision process of protocol/sequence controller 1314 is described, it should be understood that a similar decision process may be undertaken by protocol/sequence controller 908 in controlling the components of fob 902. Indeed, as described above, protocol/sequence controller 1314 may have similar operation and design as protocol/sequence controller 908.

Encryption/decryption component 1018 may be further in communication with a secure account number database 1020 which stores the security keys necessary for decrypting the encrypted fob account number. Upon appropriate request from protocol/sequence controller 1314, encryption/decryption component (e.g., circuitry 1018) may retrieve the appropriate security key, decrypt the fob account number and forward the decrypted account number to protocol sequence controller 1314 in any format readable by any later connected POS device. In one exemplary embodiment, the account number may be forwarded in a conventional magnetic stripe format compatible with the ISO/IEC 7813 standard. Upon receiving the account number in magnetic stripe format, protocol/sequence controller 1314 may forward the account number to POS device. POS device may receive the decrypted account number and forward the magnetic stripe formatted account number to a merchant network for processing under the merchant's business as usual standard. In this way, the present invention eliminates the need of a third-party server. Further, where the POS device receives a response from a merchant network (e.g., transaction authorized or denied), protocol/sequence controller 1314 may provide the merchant network response to the RF module 1302 for optically and/or audibly communicating the response to the fob 902 user.

Figure 12:
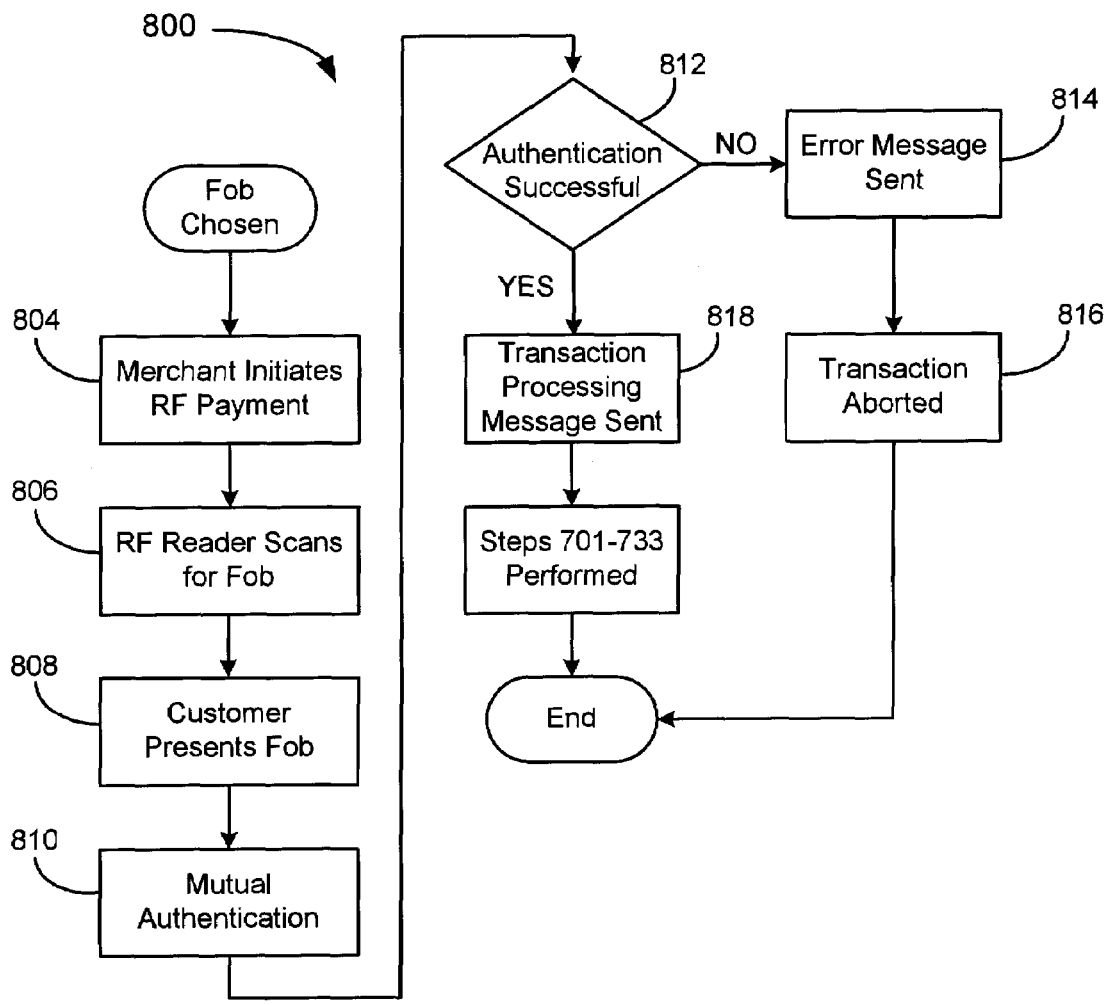
FIG. 12 depicts and exemplary flow diagram for the operation of a typical RFID payment device in accordance with the present invention.

FIG. 12 illustrates an exemplary flow diagram for the operation of an exemplary transaction system according to the present invention utilizing a RFID fob 902 and a RFID reader 1004. The process is initiated when a customer desires to present a fob 902 for payment (step 802). Upon presentation of the fob 902, the merchant initiates the RF payment procedure via a RFID reader 1004 (step 804). In particular, the RFID reader 1004 sends out an interrogation signal to scan for the presence of fob 902 (step 806). The RF signal may be provided via the RFID reader 1004 antenna 1006 or optionally via an external antenna 1008. The customer then may present the fob 902 for payment (step 808) and the fob 902 is activated by the RF interrogation signal provided.

The fob 902 and the RFID reader 1004 may then engage in mutual authentication (step 810). Where the mutual authentication is unsuccessful, an error message may be provided to the customer via the RFID optical and/or audible indicator (step 814) and the transaction may be aborted (step 816). Where the mutual authentication is successful (step 812), the RFID reader 1004 may provide the customer with an appropriate optical and/or audible message (e.g., "transaction processing" or "wait") (step 818).

Once the fob 902 and RFID reader 1004 mutually authenticate, the RFID transaction may proceed in accordance with the method described respecting smartcard 100 and FIG. 7.

Particularly, the RFID reader 1004 may act as a pass through device forwarding information from the fob 902 and the merchant system 704 for authentication and authorization according to steps 701-733. The merchant system 704 and the fob 902 may determine if the transaction should be authorized for offline completion, forwarded to an issuer for online authorization, or declined authorization offline. As such, it should be understood that the fob database 912, 914 may be of similar construction and operation as is discussed with the data storage of smartcard 100. Thus, the fob 902 may be operable to return similar responses to the merchant system 704 as is discussed with reference to the responses of smartcard 100. After the RFID reader 1004 and the fob 902 mutually authenticate, the transaction may proceed to the transaction authentication, user identify verification, and transaction completion process of FIG. 7.

It should be noted that the transaction account associated with the fob 902 may include a restriction, such as, for example, a per purchase spending limit, a time of day use, a day of week use, certain merchant use and/or the like, wherein an additional verification is required when using the fob outside of the restriction. The restrictions may be personally assigned by the fob 902 user, or the account provider. For example, in one exemplary embodiment, the account may be established such that purchases above $X (i.e., the spending limit) must be verified by the customer. Such verification may be provided using a suitable personal identification number (PIN) which may be recognized by the RFID reader 1004 or a payment authorization center (not shown) as being unique to the fob 902 holder (e.g., customer) and the correlative fob 902 transaction account number. Where the requested purchase is above the established per purchase spending limit, the customer may be required to provide, for example, a PIN, biometric sample and/or similar secondary verification to complete the transaction.

Where a verification PIN is used as secondary verification the verification PIN may be checked for accuracy against a corroborating PIN which correlates to the fob 902 transaction account number. The corroborating PIN may be stored locally (e.g., on the fob 902, or on the RFID reader 1004) or may be stored on a database (not shown) at the payment authorization center. The payment authorization center database may be any database maintained and operated by the fob 902 transaction account provider.

While the example transactions set forth above are described in general terms, the particular nature of data flow to and from the appropriate memory locations within the card will be apparent to those skilled in the art.

Moreover, although the inventions set forth herein have been described in conjunction with the appended drawing figures, those skilled in the art will appreciate that the scope of the invention is not so limited. For example, although the preferred embodiment of the invention is discussed in the context of a standard, credit card-sized smartcard with external contacts, it will be appreciated that virtually any portable memory device suitably configured may be utilized to practice this invention, for example, contactless cards, optical cards, minicards, "supersmart" cards, and the like. Hence, various modifications in the design and arrangement of the components and steps discussed herein may be made without departing from the scope of the invention as set forth in the appended claims.

The invention claimed is:

1. A method for securing a transaction utilizing a proximity integrated circuit (PIC) transaction device and a merchant system comprising:

determining a first merchant action analysis result, at the merchant system, based at least in part on one of an authentication of the PIC transaction device using Offline Data Authentication (ODA), a transaction process restriction, and a merchant risk management factor, the first merchant action analysis result indicating at least one of approving the transaction offline, approving the transaction online, and denying the transaction;

requesting, by the merchant system, an application cryptogram from the PIC transaction device, the application cryptogram being one of a cryptogram for approving the transaction offline, a cryptogram for approving the transaction online, and a cryptogram for denying the transaction based on the first merchant action analysis result;

determining a first card action analysis result, at the PIC transaction device, the first card action analysis result indicating at least one of approving the transaction offline, approving the transaction online, and denying the transaction;

transmitting, by the PIC transaction device, the first card action analysis result to the merchant system, wherein the first card action analysis result includes the requested application cryptogram;

requesting, by the merchant system, based on at least one of the first merchant action analysis result and the first card action analysis result, an authorization response from a PIC issuer system; and if the merchant system receives the authorization response from the PIC issuer system, determining, at the merchant system, based at least in part on a predetermined rule and at least one of the first merchant action analysis result and the first card action analysis result, whether to approve the transaction offline or deny the transaction offline.

2. A method of claim 1, wherein the authentication includes authenticating, offline, a portion of application data stored in the PIC.

3. A method of claim 1, comprising authorizing the transaction online.

4. A method of claim 1, comprising authorizing the transaction offline.

5. A method of claim 4, comprising authenticating the PIC issuer system online.

6. A method of claim 5, comprising authorizing the transaction by requesting application data from the PIC transaction device.

7. A method of claim 5, comprising receiving a response to a request for PIC issuer system authentication online, using the response to the request for authorization of the PIC issuer system as an input to a second merchant action analysis result.

8. A system for securing a transaction comprising:

a proximity integrated circuit (PIC) transaction device, the PIC transaction device being operable to;

determine a first card action analysis result, the first card action analysis result indicating at least one of approving the transaction offline, approving the transaction online, and denying the transaction; and transmit the first card action analysis result to a merchant system, wherein the first card action analysis result includes a requested application cryptogram; and the merchant system in communication with the PIC transaction device, the merchant system being operable to;

determine a first merchant action analysis result based at least in part on one of an authentication of the PIC transaction device using Offline Data Authentication (ODA), a transaction process restriction, and a merchant risk management factor, the first merchant action analysis result indicating at least one of approving the transaction offline, approving the transaction online, and denying the transaction;

request the application cryptogram from the PIC transaction device, the application cryptogram being one of a cryptogram for approving the transaction offline, a cryptogram for approving the transaction online, and a cryptogram for denying the transaction based on the first merchant action analysis result;

request, based on at least one of the first merchant action analysis result and the first card action analysis result, an authorization response from a PIC issuer system; and determine if the merchant system receives the authorization response from the PIC issuer system, whether to approve the transaction offline or deny the transaction offline based at least in part on a predetermined rule and at least one of the first merchant action analysis result and the first card action analysis result.

9. A system of claim 8, wherein the PIC transaction device is operable to provide a plurality of application cryptograms, a plurality of PIC issuer-predetermined transaction processing rulesa PIC issuer-defined dataset for use in performing a PIC issuer-defined risk management analysis, and a plurality of transaction disposition cryptograms in response to a command dataset for use in communicating with the PIC transaction device.

10. A system of claim 8, wherein the merchant system is operable to generate a merchant transaction disposition in accordance with a merchant risk management analysis performed by a merchant risk management application.

11. A system of claim 10, wherein the merchant system is operable to authenticate the PIC transaction device in response to receipt of at least one of the requested application cryptogram, a PIC issuer-predetermined transaction processing rule, a PIC issuer-defined dataset for use in performing a PIC issuer-defined risk management analysis, a transaction disposition cryptogram, and a merchant risk management analysis.

12. A system of claim 11, wherein the merchant system is operable to authorize the transaction in response to receipt of at least one of the requested application cryptogram, a PIC issuer-predetermined transaction processing rule, a PIC issuer-defined dataset for use in performing a PIC issuer-defined risk management analysis, a PIC issuer-provided authentication cryptogram, a transaction disposition cryptogram, and a merchant risk management analysis.

13. A computer-readable storage medium having stored thereon sequences of instructions, the sequences of instructions including instructions which when executed by a computer system cause the computer system to perform:

determining a first merchant action analysis result, at a merchant system, based at least in part on one of an authentication of a proximity integrated circuit (PIC) transaction device using Offline Data Authentication (ODA), a transaction process restriction, and a merchant risk management factor, the first merchant action analysis result indicating at least one of approving a transaction offline, approving the transaction online, and denying the transaction;

requesting, by the merchant system, an application cryptogram from the PIC transaction device, the application cryptogram being one of a cryptogram for approving the transaction offline, a cryptogram for approving the transaction online, and a cryptogram for denying the transaction based on the first merchant action analysis result;

determining a first card action analysis result, at the PIC transaction device, the first card action analysis result indicating at least one of approving the transaction offline, approving the transaction online, and denying the transaction;

transmitting, by the PIC transaction device, the first card action analysis result to the merchant system, wherein the first card action analysis result includes the requested application cryptogram;

requesting, by the merchant system, based on at least one of the first merchant action analysis result and the first card action analysis result, an authorization response from a PIC issuer system; and if the merchant system receives a the authorization response from the PIC issuer system, determining, at the merchant system, based at least in part on a predetermined rule and at least one of the first merchant action analysis result and the first card action analysis result, whether to approve the transaction offline or deny the transaction off line.

* * * * *